US012470062B2

(12) United States Patent
Aghatehrani et al.

(10) Patent No.: US 12,470,062 B2
(45) Date of Patent: Nov. 11, 2025

(54) FREQUENCY DROOP TO COORDINATE HYDROGEN PRODUCTION

(71) Applicant: Ohmium International, Inc., Incline Village, NV (US)

(72) Inventors: Rasool Aghatehrani, Redwood City, CA (US); Arne Ballantine, Lugano (CH); Anil Kumar Adapa, Tadepalligudem (IN); Chockkalingam Karuppaiah, Fremont, CA (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/136,093

(22) Filed: Apr. 18, 2023

(65) Prior Publication Data

US 2023/0335990 A1    Oct. 19, 2023

Related U.S. Application Data

(60) Provisional application No. 63/332,156, filed on Apr. 18, 2022.

(51) Int. Cl.
*H02J 3/12*      (2006.01)
*H02J 3/32*      (2006.01)
*H02J 3/38*      (2006.01)

(52) U.S. Cl.
CPC ............. *H02J 3/12* (2013.01); *H02J 3/32* (2013.01); *H02J 3/38* (2013.01)

(58) Field of Classification Search
CPC ........ H02J 3/12; H02J 3/32; H02J 3/38; H02J 3/381; H02J 2300/30; Y02E 60/50
See application file for complete search history.

(56) References Cited

U.S. PATENT DOCUMENTS 6,351,106 B1   2/2002   Kramer et al.
8,669,499 B2   3/2014   Conrad
(Continued)

FOREIGN PATENT DOCUMENTS

CN   104426351 A   3/2015
CN   104956581 A   9/2015
(Continued)

OTHER PUBLICATIONS

PCT Application No. PCT/US23/18826 International Search Report and Written Opinion dated Oct. 31, 2023.
(Continued)

*Primary Examiner* — Rexford N Barnie
*Assistant Examiner* — Thai H Tran
(74) *Attorney, Agent, or Firm* — Polsinelli LLP

(57) ABSTRACT

A system and method of power management for a power generation system is disclosed. A method of power management for a hydrogen generation system including one or more electrochemical stacks, the one or more electrochemical stacks receiving power from an electrical grid including at least one power source, includes: receiving a frequency or voltage reference value for the hydrogen generation system; continually monitoring a frequency or voltage of the electrical grid; and varying a load of the hydrogen generation system in response to the frequency or voltage of the electrical grid differing from the frequency or voltage reference value to restore the frequency or voltage of the electrical grid to the frequency or voltage reference value.

19 Claims, 7 Drawing Sheets

(56) References Cited

U.S. PATENT DOCUMENTS

| | | |
|---|---|---|
| 8,936,704 B1 | 1/2015 | Li |
| 9,461,319 B2 | 10/2016 | Sudhan et al. |
| 9,461,320 B2 | 10/2016 | Ballantine et al. |
| 9,885,759 B2 | 2/2018 | Schipfer et al. |
| 10,573,910 B2 | 2/2020 | Sudhan S et al. |
| 10,811,975 B1 | 10/2020 | Bala et al. |
| 12,166,373 B2 | 12/2024 | Utz |
| 12,394,991 B2 | 8/2025 | Ballantine et al. |
| 12,410,532 B2 | 9/2025 | Srinivasan et al. |
| 2004/0199294 A1 | 10/2004 | Fairlie et al. |
| 2007/0179672 A1 | 8/2007 | Fairlie et al. |
| 2008/0121525 A1 | 5/2008 | Doland |
| 2009/0048716 A1 | 2/2009 | Marhoefer |
| 2009/0189445 A1 | 7/2009 | Strizki |
| 2009/0303762 A1 | 12/2009 | Jang et al. |
| 2010/0114395 A1 | 5/2010 | Hinatsu et al. |
| 2011/0155583 A1 | 6/2011 | Li |
| 2013/0168236 A1 | 7/2013 | Zadeh et al. |
| 2013/0201729 A1 | 8/2013 | Ahsanuzzaman et al. |
| 2013/0224614 A1 | 8/2013 | Fabian et al. |
| 2014/0021785 A1 | 1/2014 | Munier et al. |
| 2014/0079593 A1 | 3/2014 | Naito et al. |
| 2015/0001092 A1 | 1/2015 | Preston et al. |
| 2015/0072257 A1 | 3/2015 | Mata et al. |
| 2015/0293179 A1 | 10/2015 | Schipfer et al. |
| 2016/0013729 A1 | 1/2016 | Josse et al. |
| 2016/0060776 A1 | 3/2016 | Kawajiri et al. |
| 2016/0244890 A1 | 8/2016 | Petipas et al. |
| 2019/0245432 A1 | 8/2019 | Yan et al. |
| 2019/0259088 A1 | 8/2019 | Cooper |
| 2019/0288539 A1 | 9/2019 | Vela Garcia |
| 2019/0293722 A1 | 9/2019 | Choi et al. |
| 2019/0296403 A1 | 9/2019 | Ballantine et al. |
| 2019/0310215 A1 | 10/2019 | Ballantine et al. |
| 2019/0312317 A1 | 10/2019 | Ballantine et al. |
| 2019/0317151 A1 | 10/2019 | Ballantine et al. |
| 2019/0317152 A1 | 10/2019 | Ballantine et al. |
| 2020/0010961 A1 | 1/2020 | Kazuno et al. |
| 2020/0295594 A1 | 9/2020 | Reimann et al. |
| 2021/0155491 A1 | 5/2021 | Ballantine et al. |
| 2021/0156038 A1 | 5/2021 | Ballantine et al. |
| 2021/0156039 A1* | 5/2021 | Ballantine ............... C25B 15/02 |
| 2021/0179996 A1 | 6/2021 | Nygren et al. |
| 2021/0317588 A1 | 10/2021 | Falk et al. |
| 2021/0363651 A1 | 11/2021 | Seymour et al. |
| 2021/0384815 A1 | 12/2021 | Kolar et al. |
| 2021/0404078 A1 | 12/2021 | Srinivasan |
| 2022/0065162 A1 | 3/2022 | Hunt et al. |
| 2022/0108262 A1 | 4/2022 | Cella et al. |
| 2022/0220620 A1 | 7/2022 | Dykstra et al. |
| 2023/0050530 A1 | 2/2023 | Unru et al. |
| 2023/0170706 A1 | 6/2023 | Mabe et al. |
| 2023/0198247 A1 | 6/2023 | Putz et al. |
| 2023/0223861 A1 | 7/2023 | Everts |
| 2023/0231162 A1 | 7/2023 | Ballantine et al. |
| 2023/0243055 A1* | 8/2023 | Pmsvvsv ................ H02J 3/28 205/335 |
| 2023/0302954 A1 | 9/2023 | Inoue |
| 2023/0332311 A1 | 10/2023 | Karuppaiah et al. |
| 2023/0332312 A1 | 10/2023 | Karuppaiah et al. |
| 2023/0332313 A1 | 10/2023 | Karuppaiah et al. |
| 2023/0332315 A1 | 10/2023 | Karuppaiah et al. |
| 2023/0332316 A1 | 10/2023 | Karuppaiah et al. |
| 2023/0333530 A1 | 10/2023 | Karuppaiah |
| 2023/0352934 A1 | 11/2023 | Steimer et al. |
| 2024/0124989 A1 | 4/2024 | Ballantine et al. |
| 2024/0352608 A1 | 10/2024 | Srinivasan et al. |

FOREIGN PATENT DOCUMENTS

| | | |
|---|---|---|
| CN | 110445365 A | 11/2019 |
| CN | 114337322 A | 4/2022 |
| CN | 115204929 A | 10/2022 |
| CN | 115358806 A | 11/2022 |
| CN | 115796487 A | 3/2023 |
| CN | 115940284 A | 4/2023 |
| CN | 116109037 A | 5/2023 |
| EP | 4172606 A1 | 5/2023 |
| EP | 4511530 | 2/2025 |
| EP | 4511893 | 2/2025 |
| EP | 4602711 | 8/2025 |
| JP | 2015-050934 | 3/2015 |
| JP | 2017-220963 | 12/2017 |
| JP | 2018-066626 | 4/2018 |
| JP | 2019170097 A | 10/2019 |
| JP | 2023531491 A | 7/2023 |
| KR | 101452642 B1 | 10/2014 |
| KR | 20170046417 A | 5/2017 |
| KR | 102306918 B1 | 9/2021 |
| TW | 561673 B | 11/2003 |
| TW | 200633356 A | 9/2005 |
| TW | 202219500 A | 5/2022 |
| WO | 2018236649 A1 | 12/2018 |
| WO | 2020051557 A1 | 3/2020 |
| WO | 2021263231 A1 | 12/2021 |
| WO | 2023104267 A1 | 6/2023 |
| WO | 2023141219 A2 | 7/2023 |
| WO | 2023205079 A1 | 10/2023 |
| WO | 2023205082 A1 | 10/2023 |
| WO | 2023205090 A1 | 10/2023 |
| WO | 2023205104 A1 | 10/2023 |
| WO | 2023205126 A1 | 10/2023 |
| WO | 2023205139 A1 | 10/2023 |
| WO | 2023205154 A1 | 10/2023 |
| WO | 2024081426 A1 | 4/2024 |

OTHER PUBLICATIONS

PCT Application No. PCT/US23/11162 Invitation to Pay Additional Fees dated Apr. 17, 2023.

PCT Application No. PCT/US23/11162 International Search Report and Written Opinion dated Jun. 28, 2023.

PCT Application No. PCT/US23/18822 Invitation to Pay Additional Fees dated Jun. 26, 2023.

PCT Application No. PCT/US23/18877 Invitation to Pay Additional Fees dated Jun. 26, 2023.

PCT Application No. PCT/US2021/039371 International Search Report and Written Opinion dated Oct. 28, 2021.

PCT Application No. PCT/US23/35152 International Search Report and Written Opinion dated Oct. 31, 2023.

European Search Report Application No. 21829180.5 dated Jun. 24, 2024.

Ding, W. et al., "A Novel Segmented Component Injection Scheme to Minimize the Oscillation of DC-Link Voltage Under Balanced and Unbalanced Conditions for Vienna Rectifier," IEEE Transactions on Power Electronics, vol. 34, No. 10, Oct. 2019, XP011733588, pp. 9536-9551.

Rivera, S. et al., "Electric Vehicle Charging Station Using a Neutral Point Clamped Converter With Bipolar DC Bus," IEEE Transactions on Industrial Electronics, vol. 62, No. 4, Apr. 2015, XP011574565, pp. 1999-2009.

Ye, J. et al., "Simplified Four-Level Inverter-Based Dynamic Voltage Restorer With Single DC Power Source," IEEE Access, vol. 7, Oct. 2019, XP011748357, pp. 137461-137471.

PCT Application No. PCT/US23/18822 International Search Report and Written Opinion dated Aug. 31, 2023.

PCT Application No. PCT/US23/18934 International Search Report and Written Opinion dated Aug. 31, 2023.

PCT Application No. PCT/US23/18911 International Search Report and Written Opinion dated Jul. 27, 2023.

PCT Application No. PCT/US23/18877 International Search Report and Written Opinion dated Aug. 31, 2023.

PCT Application No. PCT/US23/18953 International Search Report and Written Opinion dated Aug. 4, 2023.

PCT Application No. PCT/US23/18851 International Search Report and Written Opinion dated Oct. 3, 2023.

U.S. Appl. No. 18/099,151, Arne Ballantine, System and Method for Controlling Hydrogen Stack, Jan. 19, 2023.

(56) References Cited

OTHER PUBLICATIONS

U.S. Appl. No. 17/360,153, Ramesh Srinivasan, Impedance Monitoring of a Modular, Jun. 28, 2021.
U.S. Appl. No. 18/135,431, Chockkalingam Karuppaiah, System and Method for Controlling Production, Storage, and/or Distribution of Hydrogen, Apr. 17, 2023.
U.S. Appl. No. 18/136,083, Chockkalingam Karuppaiah, System and Method for Efficiently Generating Hydrogen Using Multiple Available Power Sources, Apr. 18, 2023.
U.S. Appl. No. 18/135,444, Chockkalingam Karuppaiah, Hydrogen Generation System With Mission Critical Control, Apr. 17, 2023.
U.S. Appl. No. 18/135,571, Chockkalingam Karuppaiah, Power Distribution for a Hydrogen Generation System, Apr. 17, 2023.
U.S. Appl. No. 18/135,902, Chockkalingam Karuppaiah, Voltage and Frequency Response and Regulation in a Hydrogen Generation System, Apr. 18, 2023.
U.S. Appl. No. 18/135,724, Chockkalingam Karuppaiah, System and Method for Controlling Hydrogen Production Based on Power Production and/or Power, Apr. 17, 2023.
PCT Application No. PCT/US23/11162, International Preliminary Report on Patentability dated Aug. 2, 2024.
PCT Application No. PCT/US21/39371, International Preliminary Report on Patentability dated Jan. 5, 2023.
PCT Application No. PCT/US23/18822, International Preliminary Report on Patentability dated Oct. 31, 2024.
PCT Application No. PCT/US23/18934, International Preliminary Report on Patentability dated Oct. 31, 2024.
PCT Application No. PCT/US23/18826, International Preliminary Report on Patentability dated Oct. 31, 2024.
PCT Application No. PCT/US23/18851, International Preliminary Report on Patentability dated Oct. 31, 2024.
PCT Application No. PCT/US23/18911, International Preliminary Report on Patentability dated Oct. 31, 2024.
PCT Application No. PCT/US23/18877, International Preliminary Report on Patentability dated Oct. 31, 2024.
PCT Application No. PCT/US23/18953, International Preliminary Report on Patentability dated Oct. 31, 2024.
PCT Application No. PCT/US23/35152, International Search Report and Written Opinion dated Apr. 24, 2025.
TW Application No. 110123618, Office Letter and Search Report dated Mar. 25, 2025.
U.S. Appl. No. 18/380,083, Non-Final Office Action dated Jan. 28, 2025.
U.S. Appl. No. 17/360,153, Non-Final Office Action dated Apr. 17, 2025.
AE Application No. P6002798/2022, First Office Action dated Apr. 24, 2025.
JP Application No. 2022-578992, Notice of Reasons for Rejection dated Apr. 30, 2025.
U.S. Appl. No. 18/099,151, Non-Final Office Action dated Aug. 12, 2025.

* cited by examiner

| Incoming Power | Load Percentage | Power To Electrochemical Stack | Droop Percentage |
|---|---|---|---|
| 63 Hz | 100% | 60 Hz | 5% |
| 63 Hz | 75% | 58 Hz | 8% |
| 63 Hz | 50% | 50 Hz | 20% |
| - | - | - | - |
| 62 Hz | 100% | 59 Hz | 5% |
| 62 Hz | 75% | 57 Hz | 8% |
| 62 Hz | 50% | 49 Hz | 21% |
| - | - | - | - |
| - | - | - | - |
| - | - | - | - |
FIG. 5
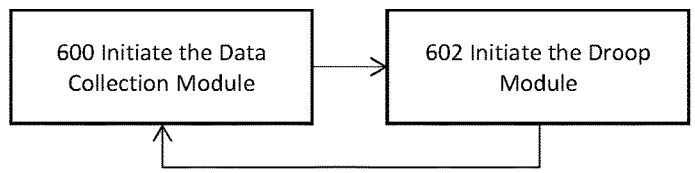
FIG. 6
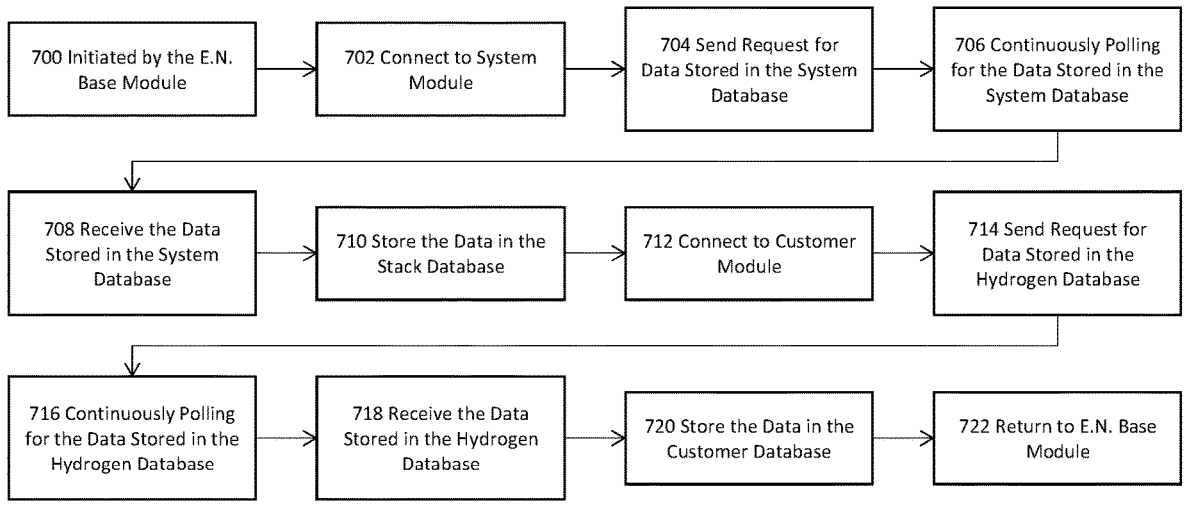
FIG. 7

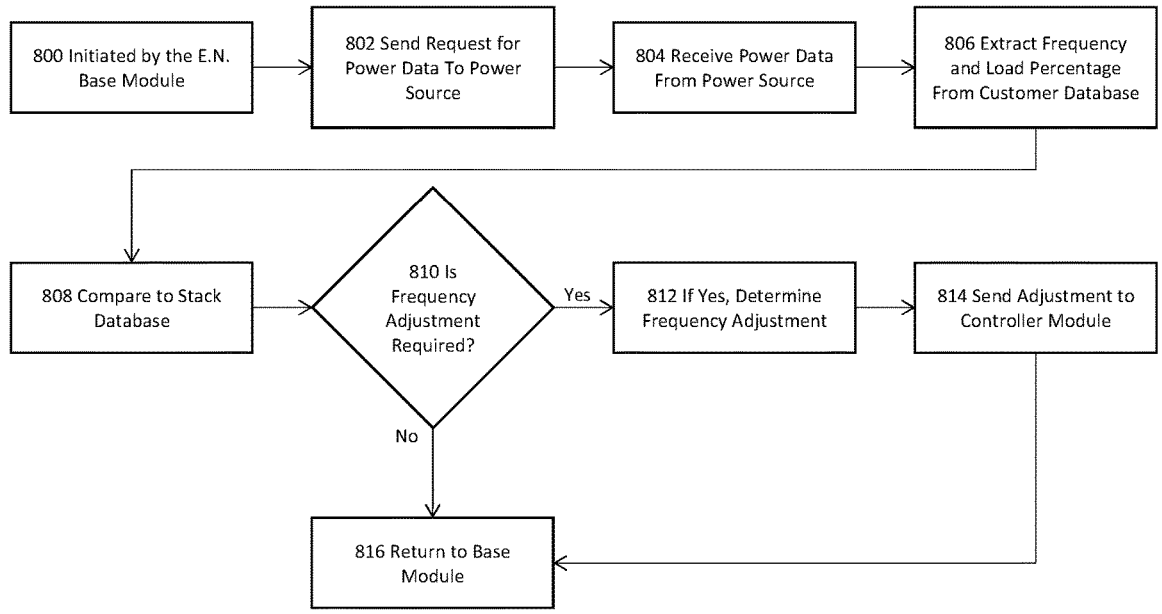

FIG. 8

| Incoming Power | Load Percentage | Power To Electrochemical Stack | Droop Percentage |
|---|---|---|---|
| 63 Hz | 100% | 60 Hz | 5% |
| 63 Hz | 75% | 58 Hz | 8% |
| 63 Hz | 50% | 50 Hz | 20% |
| - | - | - | - |
| 62 Hz | 100% | 59 Hz | 5% |
| 62 Hz | 75% | 57 Hz | 8% |
| 62 Hz | 50% | 49 Hz | 21% |
| - | - | - | - |
| - | - | - | - |
| - | - | - | - |

FIG. 9

| Customer Name | Total Number of Electrochemical Stacks | Hydrogen Request | Hydrogen Production Required | Load Percentage | Frequency Required | Number of Electrochemical Stacks Needed | Date | Time |
|---|---|---|---|---|---|---|---|---|
| Client 1 | 20 | 600 kg | 6 kg per hour per stack | 100% | 60 hz | 10 | 1/1/2022 | 8:00am |
| Client 1 | 20 | 600 kg | 6 kg per hour per stack | 100% | 60 hz | 10 | 1/2/2022 | 7:59am |
| Client 1 | 20 | 600 kg | 6 kg per hour per stack | 100% | 60 hz | 10 | 1/3/2022 | 8:01am |
| - | - | - | - | - | - | - | - | - |
| - | - | - | - | - | - | - | - | - |
| - | - | - | - | - | - | - | - | - |

FIG. 10

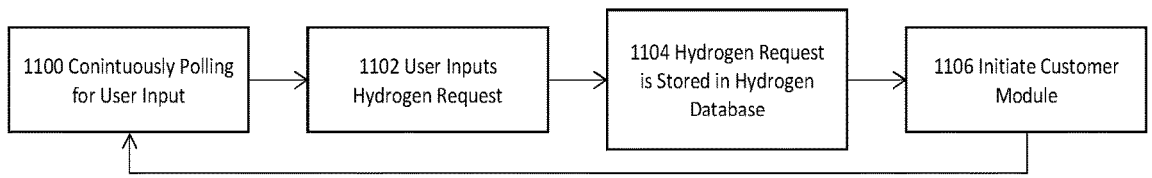
FIG. 11
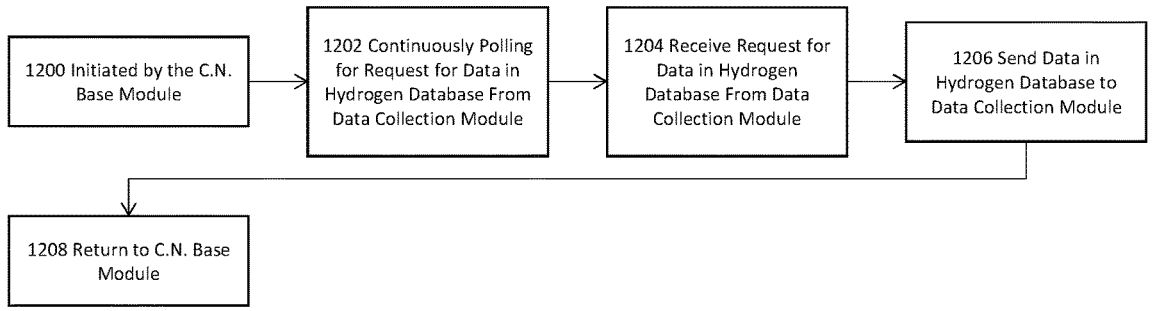
FIG. 12
| Customer Name | Total Number of Electrochemica Stacks | Hydrogen Request | Hydrogen Production Required | Load Percentage | Frequency Required | Number of Electrochemical Stacks Needed | Date | Time |
|---|---|---|---|---|---|---|---|---|
| Client 1 | 20 | 600 kg | 6 kg per hour per stack | 100% | 60 hz | 10 | 1/1/2022 | 8:00am |
| Client 1 | 20 | 600 kg | 6 kg per hour per stack | 100% | 60 hz | 10 | 1/2/2022 | 7:59am |
| Client 1 | 20 | 600 kg | 6 kg per hour per stack | 100% | 60 hz | 10 | 1/3/2022 | 8:01am |
| - | - | - | - | - | - | - | - | - |
| - | - | - | - | - | - | - | - | - |
| - | - | - | - | - | - | - | - | - |
FIG. 13

FREQUENCY DROOP TO COORDINATE HYDROGEN PRODUCTION

CROSS-REFERENCE TO RELATED APPLICATIONS

This application claims the benefit of U.S. Provisional Application No. 63/332,156, filed Apr. 18, 2022, for "FREQUENCY DROOP TO COORDINATE HYDROGEN PRODUCTION," which is incorporated herein by reference in its entirety.

FIELD OF THE DISCLOSURE

The present disclosure is generally related to hydrogen production and, more specifically, to power management for a hydrogen generation system.

BACKGROUND

Currently, hydrogen generation systems rarely account for frequency droop when determining or maintaining hydrogen production. Moreover, hydrogen generation systems do not adjust frequencies, voltages, and/or loads to maintain grid stability and/or hydrogen production rates. Thus, there is a need for a power management system for coordinating hydrogen production.

SUMMARY

According to one aspect, a method is provided for power management of a hydrogen generation system including one or more electrochemical stacks, the one or more electrochemical stacks receiving power from an electrical grid including at least one power source. The method includes receiving a frequency or voltage reference value for the hydrogen generation system. The method also includes continually monitoring a frequency or voltage of the electrical grid. The method further includes varying a load of the hydrogen generation system in response to the frequency or voltage of the electrical grid differing from the frequency or voltage reference value to restore the frequency or voltage of the electrical grid to the frequency or voltage reference value.

In some examples, varying includes increasing the load of the hydrogen generation system if the frequency or voltage of the electrical grid is greater than the frequency or voltage reference value. In an example, increasing the load includes adding at least one new electrochemical stack to the one or more electrochemical stacks receiving power from the electrical grid or increasing the power to at least one of the one or more electrochemical stacks. In another example, increasing the load includes charging at least one storage battery.

In other examples, varying includes decreasing the load of the hydrogen generation system if the frequency or voltage of the electrical grid is lower than the frequency or voltage reference value. As an example, decreasing the load includes removing at least one electrochemical stack from the one or more electrochemical stacks receiving power from the electrical grid or decreasing the power to at least one of the one or more electrochemical stacks. In another example, the method further includes adding power from a storage battery to the electrical grid to restore the frequency or voltage of the electrical grid to the frequency or voltage reference value.

In some examples, the electrical grid includes at least one of a municipal electrical grid or a microgrid including one or more direct current (DC) power sources coupled to the electrical grid via one or more power converters. In certain examples, the method further includes using droop control to maintain frequency or voltage stability of the electrical grid. In an example, the frequency or voltage reference value includes a frequency or voltage needed to maintain a rate of hydrogen production.

According to another aspect, a power management system is provided for a hydrogen generation system including one or more electrochemical stacks, the one or more electrochemical stacks receiving power from an electrical grid including at least one power source. The power management system includes a memory to store a frequency or voltage reference value for the hydrogen generation system. The power management system also includes a communication interface to continually monitoring a frequency or voltage of the electrical grid. The power management system further includes a controller to vary a load of the hydrogen generation system in response to the frequency or voltage of the electrical grid differing from the frequency or voltage reference value to restore the frequency or voltage of the electrical grid to the frequency or voltage reference value.

In some examples, the controller is to vary the load of the hydrogen generation system by increasing the load of the hydrogen generation system if the frequency or voltage of the electrical grid is greater than the frequency or voltage reference value. In an example, the controller is to increase the load by adding at least one new electrochemical stack to the one or more electrochemical stacks receiving power from the electrical grid or increasing the power to at least one of the one or more electrochemical stacks. In another example, the controller is to increase the load by charging at least one storage battery.

In other examples, the controller is to vary the load of the hydrogen generation system by decreasing the load of the hydrogen generation system if the frequency or voltage of the electrical grid is lower than the frequency or voltage reference value. In an example, the controller is to decrease the load by removing at least one electrochemical stack from the one or more electrochemical stacks receiving power from the electrical grid or decreasing the power to at least one of the one or more electrochemical stacks. In another example, the controller is further to add power from a storage battery to the electrical grid to restore the frequency or voltage of the electrical grid to the frequency or voltage reference value.

In still other examples, the electrical grid includes at least one of a municipal electrical grid or a microgrid including one or more direct current (DC) power sources coupled to the electrical grid via one or more power converters. In an example, the controller is to use droop control to maintain frequency or voltage stability of the electrical grid. In yet another example, the frequency or voltage reference value includes a frequency or voltage needed to maintain a rate of hydrogen production.

According to a further aspect, a non-transitory computer-readable medium is provided including program code that, when executed by one or more processors, cause the one or more processors to perform a method of power management for a hydrogen generation system including one or more electrochemical stacks, the one or more electrochemical stacks receiving power from an electrical grid including at least one power source. The method includes receive a frequency or voltage reference value for the hydrogen generation system. The method also includes continually monitoring a frequency or voltage of the electrical grid. The method further includes varying a load of the hydrogen generation system in response to the frequency or voltage of the electrical grid differing from the frequency or voltage reference value to restore the frequency or voltage of the electrical grid to the frequency or voltage reference value.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment. Non-limiting and non-exhaustive descriptions are described with reference to the following drawings. The components in the figures are not necessarily to scale, emphasis instead being placed upon illustrating principles of the disclosed embodiments.

FIG. 5 illustrates a system database, according to an embodiment.

FIG. 6 is a flowchart of a process performed by an E.N. base module, according to an embodiment.

FIG. 7 is a flowchart of a process performed by a data collection module, according to an embodiment.

FIG. 8 is a flowchart of a process performed by a droop module, according to an embodiment.

FIG. 9 illustrates a stack database, according to an embodiment.

FIG. 10 illustrates a customer database, according to an embodiment.

FIG. 11 is a flowchart of a process performed by a C.N. base module, according to an embodiment.

FIG. 12 is a flowchart of a process performed by a customer module, according to an embodiment.

FIG. 13 illustrates a hydrogen database, according to an embodiment.

DETAILED DESCRIPTION

Some embodiments of this disclosure will now be discussed in detail. The embodiments are intended to be open-ended in that an item or items used in the embodiments is not meant to be an exhaustive listing of such items or items or meant to be limited to only the listed item or items.

Figure 1:
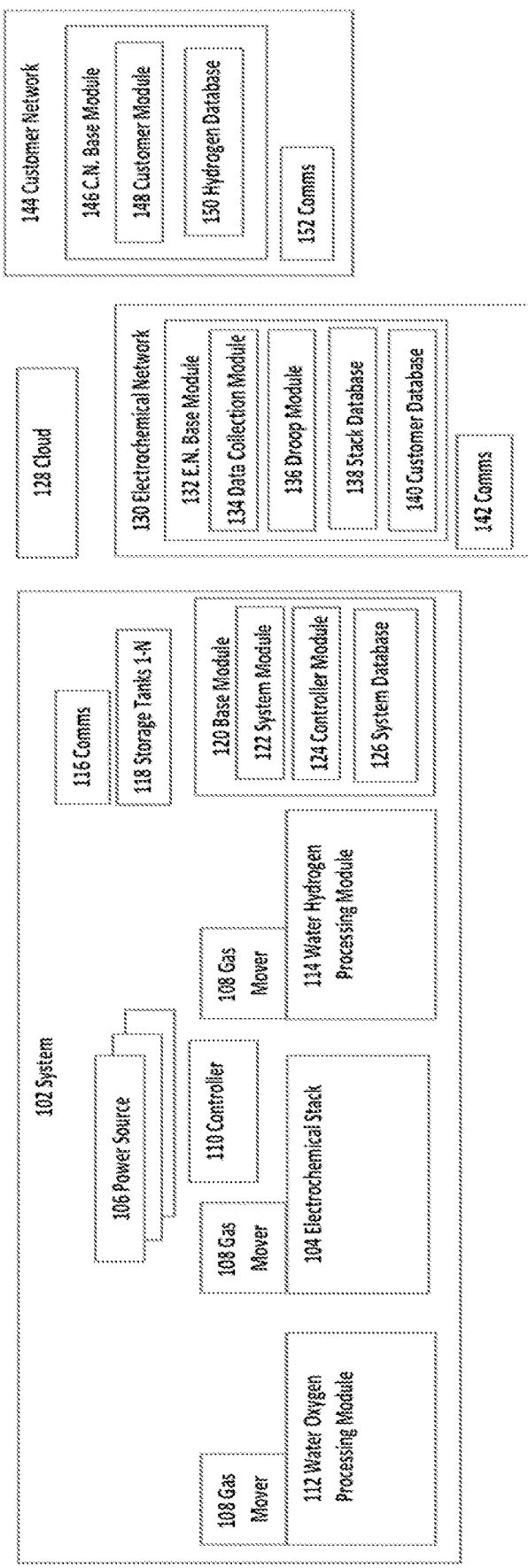
FIG. 1 is a block diagram of a hydrogen generation system, according to an embodiment.

Referring to FIG. 1, a system 102 for hydrogen generation includes at least one cabinet defining a water oxygen processing module 112, an electrochemical stack 104, and a water hydrogen processing module 114 (the water oxygen processing module 112, the electrochemical stack 104, and the water hydrogen processing module 114 being fluidically isolated from each other), a water circuit located in the water oxygen processing module 112, an electrochemical module including an electrolyzer electrochemical stack located in the electrochemical stack 104, a hydrogen circuit located in the water hydrogen processing module 114, at least one first fluid connector fluidly connecting the water circuit and the electrolyzer electrochemical stack, and at least one second fluid connector fluidly connecting the electrolyzer electrochemical stack and the hydrogen circuit. The system 102 may include a power source 106, a plurality of gas movers 108, a controller 110, comms 116, and one or more storage tanks 1-N 118.

The electrochemical stack 104 may include a first membrane electrode assembly (MEA), a second membrane electrode assembly (MEA), and a bipolar plate that collectively defines two complete electrochemical cells for hydrogen generation. The electrochemical stack 104 may also include a first end plate and a second end plate that may sandwich the first MEA, the second MEA, and the bipolar plate into contact with one another and direct the flow of fluids into and out of the electrochemical stack 104. While the electrochemical stack 104 is described as including two complete cells—a single bipolar plate and two MEAs—it shall be appreciated that this is for the sake of clarity of explanation only. It shall be more generally understood that the electrochemical stack 104 may include any number of MEAs and bipolar plates useful for meeting the hydrogen generation demands of the system 102 while maintaining separation between pressurized hydrogen and lower pressure water and oxygen flowing through the electrochemical stack 104. That is unless otherwise specified or made clear from the context, the electrochemical stack 104 may include more than one bipolar plate, a single MEA, and/or more than two MEAs. In some embodiments, an instance of the bipolar plate may be disposed between the first end plate and the first MEA and/or between the second end plate and the second MEA without departing from the scope of the present disclosure.

In general, the first MEA and the second MEA may be identical to one another. For example, the first MEA may include an anode, a cathode, and a proton exchange membrane (e.g., a PEM electrolyte) a therebetween. Similarly, the second MEA may include an anode, a cathode, and a proton exchange membrane therebetween. The anodes may each comprise an anode catalyst (i.e., electrode) contacting the membrane and an optional anode fluid diffusion layer. The cathodes may each comprise a cathode catalyst (i.e., electrode) contacting the membrane and an optional cathode gas diffusion layer. The anode electrode may comprise any suitable anode catalyst, such as an iridium layer. The anode fluid diffusion layer may comprise a porous material, mesh or weave, such as a porous titanium sheet or a porous carbon sheet. The cathode electrode may comprise any suitable cathode catalyst, such as a platinum layer. The cathode gas diffusion layer may comprise porous carbon. Other noble metal catalyst layers may also be used for the anode and/or cathode electrodes. The electrolyte may comprise any suitable proton exchange (e.g., hydrogen ion transport) polymer membrane, such as a Nafion® membrane composed of sulfonated tetrafluoroethylene-based fluoropolymer-copolymer with a formula $C_7HF_{13}O_5S \cdot C_2F_4$.

The bipolar plate may be disposed between the cathode of the first MEA and the anode of the second MEA. In general, the bipolar plate may include a substrate, an anode gasket, and a cathode gasket. The substrate has an anode (i.e., water) side and a cathode (i.e., hydrogen) side opposite one another. The anode gasket may be fixed to the anode side of the substrate, and the cathode gasket may be fixed to the cathode side of the substrate. Such fixed positioning of the anode gasket and the cathode gasket on opposite sides of the substrate may facilitate forming two seals that are consistently placed relative to one another and relative to the first MEA and the second MEA on either side of the bipolar plate. The gaskets form a double seal around the active areas, i.e., anode (e.g., water) flow field and cathode (e.g., hydrogen) flow field, located on respective opposite sides of the bipolar plate. Further, or instead, in instances in which an electrochemical stack 104 includes an instance of an MEA between two instances of the bipolar plate, the anode gasket and the cathode gasket may form a double seal along an active area of the MEA. Thus, more generally, the anode gasket and the cathode gasket may form a sealing engagement with one or more MEAs in an electrochemical stack to isolate flows within the electrode stack and, thus, reduce the likelihood that pressurized hydrogen may inadvertently mix with a flow of water and oxygen exiting the electrochemical stack to create a combustible hydrogen-oxygen mixture in the system 102.

The substrate may be formed of any one or more of various different types of materials that are electrically conductive, thermally conductive, and have strength suitable for withstanding the high pressure of hydrogen flowing along the cathode side of the substrate during use. Thus, for example, the substrate may be at least partially formed of one or more of plasticized graphite or carbon composite. Further, or instead, the substrate may be advantageously formed of one or more materials suitable for withstanding prolonged exposure to water on the anode side of the substrate. Accordingly, in some instances, the anode side of the substrate may include an oxidation inhibitor coating that is electrically conductive, examples of which include titanium, titanium oxide, titanium nitride, or a combination thereof. The oxidation inhibitor may generally extend at least along those portions of the anode side of the substrate exposed to water during the operation of the electrochemical stack 104. That is, the oxidation inhibitor may extend at least along the anode flow field inside the anode gasket on the anode side of the substrate. In some implementations, the oxide inhibitor may extend along the plurality of anode ports (i.e., water riser openings) which extend from the anode side to the cathode side of the substrate. The oxidation inhibitor may also be located in the anode plenums, which connect the anode portions to the anode flow field on the anode side of the substrate.

A cathode ring seal may be located around each cathode port (i.e., hydrogen riser opening) on the anode side of the substrate. The cathode ring seal prevents hydrogen from leaking out into the anode flow field on the anode side of the substrate. In contrast, an anode ring seal may be located around each one or more anode ports on the cathode side of the substrate. For example, two anode ports are surrounded by a common anode ring seal to prevent water from flowing into the cathode flow field on the cathode side of the substrate.

The anode flow field includes a plurality of straight and/or curved ribs separated by flow channels oriented to direct a liquid (e.g., purified water) between at least some of the plurality of anode ports, such as may be useful for evenly distributing purified water along the anode of the second MEA. The anode gasket may circumscribe the anode flow field and the plurality of anode ports along the anode side of the substrate to limit the movement of purified water moving along the anode. That is, the anode side of the substrate may be in sealed engagement with the anode of the second MEA via the anode gasket, such that anode channels are located therebetween. Under pressure provided by a source external to the electrochemical stack 104 (e.g., such as the pump of the water circuit), a liquid provided from the first fluid connector flows along the anode channels is directed across the anode of the second MEA, from one instance of the plurality of anode ports to another instance of the plurality of anode ports, where the liquid (e.g., remaining water and oxygen) may be directed out of the electrochemical stack 104 through another first fluid connector.

Additionally, the substrate may include a plurality of cathode ports (i.e., hydrogen riser openings), each extending from the anode side to the cathode side of the substrate. The cathode side of the substrate may include a cathode flow field. The cathode flow field includes a plurality of straight and/or curved ribs separated by cathode flow channels oriented to direct gas (e.g., hydrogen) toward the plurality of cathode ports, such as may be useful for directing pressurized hydrogen formed along the cathode of the first MEA. Cathode plenums may be located between the respective cathode ports and the cathode flow field. The cathode gasket may circumscribe the cathode flow field, the cathode plenums, and the plurality of cathode ports along the cathode side of the substrate to limit the movement of the pressurized hydrogen along the cathode. For example, the cathode side of the substrate may be in sealed engagement with the cathode of the first MEA via the cathode gasket, such that the cathode flow channels are defined between the cathode of the first MEA and the cathode side of the substrate. The pressure of the hydrogen formed along the cathode may move the hydrogen along at least a portion of the cathode channels and toward the cathode ports located diagonally opposite the cathode inlet port. The pressurized hydrogen may flow out of the cathode ports and out of the electrochemical stack 104 through the second fluid connector to be processed by the hydrogen circuit.

The anode gasket on the anode side of the substrate and the cathode gasket on the cathode side of the substrate may have different shapes. For example, the anode gasket may extend between the plurality of anode ports and the plurality of cathode ports on the anode side of the substrate. In other words, the anode gasket surrounds the anode ports and the anode flow field on one lateral side but leaves the cathode portions outside its circumscribed area. Therefore, the anode gasket may fluidically isolate anode flow from cathode flow in an installed position.

In contrast, the cathode gasket on the cathode side of the substrate does not extend between the plurality of anode ports and the plurality of cathode ports. In other words, the cathode gasket surrounds the anode ports, the cathode portions, and the cathode flow field. Instead, the anode ring seals isolate the anode portions from the cathode ports and the cathode flow field on the cathode side of the substrate.

In one configuration, the anode flow field and the cathode flow field may have the same shape, albeit on the opposite side of the substrate, to provide the same active area along the first MEA and the second MEA. Thus, taken together, the differences in shape between the anode gasket and the cathode gasket, along with the positioning of the anode ring seals and the same shape of the anode flow field and the cathode flow field, may result in different sealed areas. These different sealed areas are complementary to one another to facilitate fluidically isolating the lower pressure flow of purified water along the anode channels from the pressurized hydrogen flowing along the cathode channels while nevertheless allowing each flow to move through the electrochemical stack 104 and ultimately exit the electrochemical stack 104 along different channels.

In certain implementations, the cathode flow field may be shaped such that a minimum bounding rectangle of the cathode flow field is square. As used in this context, the term minimum bounding rectangle shall be understood to be a minimum rectangle defined by the maximum x- and y-dimensions of the cathode flow field. The plurality of cathode ports may include two cathode ports per substrate which are located at diagonally opposite corners from one another with respect to the minimum bounding rectangle (e.g., within the minimum bounding rectangle). The other two diagonally opposite corners lack the cathode ports. In instances in which the minimum bounding rectangle is square, the diagonal positioning of the cathode ports relative to the minimum bounding rectangle may facilitate the flow of pressurized hydrogen diagonally along the entire cathode flow field while leaving a large margin of the substrate material for strengths against the contained internal hydrogen pressure. Alternatively, the substrate may be a rectangle. The plurality of cathode ports are positioned away from the edges of the substrate such that each one of the plurality of cathode ports is well-reinforced by the material of the substrate between the respective one of the plurality of cathode ports and the closest edge of the substrate.

Given the large pressure differential between the flow of pressurized hydrogen along the cathode channels and the flow of water and oxygen along the anode channels, the electrochemical stack 104 may include the anode fluid diffusion layer disposed in the anode channels and optionally between the anode electrode of the anode of the second MEA and the anode side (e.g., anode ribs) of the substrate. The porous material of the anode fluid diffusion layer may generally permit the flow of water and oxygen through the anode channels without a substantial increase in flow restriction through the anode channels while providing structural support on the anode side of the substrate to resist collapse that may result from the pressure difference on opposite sides of the substrate. For the sake of clear illustration, the porous material is shown along only one anode channel. It shall be understood, however, the that porous material may be disposed inside all of the anode channels in certain implementations.

As an additional, or alternative, safety measure, the electrochemical stack 104 may include a housing disposed about the first MEA, the second MEA, the bipolar plate, the first end plate, and the second end plate. More specifically, the housing may be formed of one or more materials useful for absorbing the force of one or more materials that may become ejected in the event of a failure event (e.g., failure under the force of pressurized hydrogen and/or failure resulting from an explosion of an inadvertent hydrogen-containing mixture). For example, the housing may include one or more metal or aramid (e.g., Kevlar®) fibers.

Having described various features of the electrochemical stack 104, attention is now directed to a description of the operation of the electrochemical stack 104 to form pressurized hydrogen with water and electricity as inputs. In particular, an electric field E (i.e., voltage) may be applied across the electrochemical stack 104 (i.e., between the end plates) from the power source 106. The bipolar plate may electrically connect the first MEA and the second MEA in series with one another such that electrolysis may take place at the first MEA and the second MEA to form a flow of pressurized hydrogen that is maintained fluidically isolated from lower pressure water and oxygen, except for proton exchange occurring through the proton exchange membrane and the proton exchange membrane.

Purified water (e.g., from the water circuit) may be introduced into the electrochemical stack 104 via the first fluid connector of the system 102. Within the electrochemical stack 104, the purified water may flow along an intake channel that extends through the bipolar plate, among other components, to direct the purified water to the anode of the first MEA and to the anode of the second MEA. With the electric field E applied across the anode and the cathode of the first MEA, the purified water may break down along the anode into protons ($H^+$) and oxygen. The protons ($H^+$) may move from the anode to the cathode through the proton exchange membrane. At the cathode, the protons ($H^+$) may combine with one another to form pressurized hydrogen along the cathode. Through an analogous process, pressurized hydrogen may also be formed along the cathode of the second MEA. The flows of pressurized hydrogen formed by each of the first MEA and the second MEA may combine with one another and flow out of the electrochemical stack 104 via two hydrogen exhaust channels that extend through the bipolar plate, among other components, to ultimately direct the pressurized hydrogen out of the second fluid connector of the system 102 and toward the hydrogen circuit for processing. The flows of oxygen and water along the first anode and the second anode may combine with one another and flow out of the electrochemical stack 104 via the outlet anode ports and an outlet channel that extends through the end plate, among other components, to direct this stream of water and oxygen out of the first fluid connector of the system 102 and toward the water circuit for processing.

As discussed above, the bipolar plate may be in sealed engagement with the cathode of the first MEA and the anode of the second MEA to facilitate keeping pressurized hydrogen formed along the cathode of the first MEA separate from water and oxygen flowing along the anode of the second MEA. This separation is useful for reducing the likelihood of leakage of pressurized hydrogen from the electrochemical stack 104 and, thus, may be useful in addition to, or instead of, any one or more aspects of the modularity of the system 102 with respect to safely producing industrial-scale quantities of hydrogen through electrolysis. Additionally, or alternatively, the sealed engagement facilitated by the bipolar plate may facilitate dismantling the system 102 (e.g., to repair, maintain, and/or replace the electrochemical stack 104) with a lower likelihood of spilling water in the vicinity of the cabinet.

In other embodiments, alkaline electrolyzers or solid oxide electrolyzers may be used. Alkaline electrolyzers operate via the transport of hydroxide ions (OH—) through the electrolyte from the cathode to the anode, with hydrogen being generated on the cathode side. Electrolyzers using liquid alkaline sodium or potassium hydroxide solution as the electrolyte have been commercially available for years. More modern approaches use solid alkaline exchange membranes (AEM) as the electrolyte. Solid oxide electrolyzers use a solid ceramic material as the electrolyte that selectively conducts negatively charged oxygen ions (O2−) at elevated temperatures and generates hydrogen slightly differently.

Further, embodiments may include a number of power sources 106, which may include AC energy resources, such as the power grid, wind turbines, solar farms, energy storage, and conventional energy resources, such as nuclear power stations, gas power plants, etc. Also, the power source 106 may include DC energy resources, such as wind turbines, solar photovoltaic arrays, energy store, DC power grids, etc.

Further, embodiments may include a plurality of gas movers 108 (referred to collectively as the plurality of gas movers 108 and individually as the first gas mover 108, the second gas mover 108, and the third gas mover 108). The plurality of gas movers 108 may include any one or more of various different types of fans (e.g., purge fans), blowers, or compressors unless otherwise specified or made clear from the context. In certain implementations, a powered circuit to each one of the plurality of gas movers 108 may be rated for Class 1 Division 2 operation, as specified according to the National Fire Protection Association (NFPA) 70®, National Electric Code® (NEC), Articles 500-503, 2020, the entire contents of which are incorporated herein by reference. In such implementations, each one of the plurality of gas movers 108 may be disposed within the cabinet. Alternatively, each one of the plurality of gas movers 108 may be mounted externally to the cabinet (e.g., to the roof or sidewall of the cabinet) to reduce the potential for heat or sparks to act as an inadvertent ignition source for contents of the first volume, the second volume, or the third volume.

In general, the first gas mover 108 may be in fluid communication with the first volume, the second gas mover 108 may be in fluid communication with the second volume, and the third gas mover 108 may be in fluid communication with the third volume. For example, each one of the plurality of gas movers 108 may be in fluid communication between an environment outside of the cabinet and a corresponding one of the first volume, the second volume, and the third volume and may be configured to separately ventilate the respective volume of the cabinet. Additionally, or alternatively, each of the plurality of gas movers 108 may be operable to form negative pressure in a corresponding one of the first volume, the second volume, and the third volume, relative to the environment outside of the cabinet. Such negative pressure may be useful, for example, for drawing air from the environment into the first volume, the second volume, and the third volume to reduce the likelihood that any hydrogen leaking into the first volume, the second volume, or the third volume may accumulate in a concentration above the lower ignition limit of a hydrogen-air mixture at the temperature and pressure associated with the cabinet. Further, negative pressure in the first, second, and third volumes may reduce the likelihood that an ignitable, hydrogen-containing mixture may escape from the cabinet. In certain instances, the cabinet may be insulated to facilitate maintaining one or more components in the first volume, the second volume, and the third volume within a temperature range (e.g., between about 60° C. and about 80° C.) suitable for operation of the electrochemical stack 104.

While the plurality of gas movers 108 may be useful for reducing the likelihood of unsafe conditions forming in the first volume, the second volume, or the third volume, one or more of these volumes may additionally, or alternatively, include area classified components. In such instances, the corresponding volume may be unventilated.

Further, embodiments may include a controller 110, which is in electrical communication at least with one or more components in the first volume, the second volume, or the third volume. In general, the controller 110 may include one or more processors and a non-transitory computer-readable storage medium having stored thereon instructions for causing the one or more processors to control one or more of the startup, operation, or shutdown of any one or more of various aspects of the system 102 to facilitate safe and efficient operation. For example, the controller 110 may include one or more embedded controllers for one or more components in the first volume, the second volume, or the third volume. Additionally, or alternatively, the controller 110 may be in electrical communication at least with the electrochemical stack 104 and a power source 106. Continuing with this example, the controller 110 may interrupt power to the electrochemical stack 104 in the event that an anomalous condition is detected. Further, or instead, the controller 110 may provide power to the electrochemical stack 104 after a startup protocol (e.g., purging the first volume, the second volume, and or the third volume) to reduce the likelihood of igniting a hydrogen-containing mixture in the cabinet.

In some implementations, the cabinet may define a fourth volume, and the controller 110 may be disposed in the fourth volume while being in wireless or wired communication with one or more of the various different components described herein as being disposed in one or more of the first volume, the second volume, or the third volume. The fourth volume may be generally located in the vicinity of the first volume, the second volume, and the third volume to facilitate making and/or breaking electrical connections as part of one or more of installation, startup, regular operation, maintenance, or repair. Thus, for example, the fourth volume may be disposed along a top portion of the cabinet and/or along a back portion of the cabinet, with both locations providing useful access to each of the first volume, the second volume, and the third volume while being away from the first door, the second door, and the third door that may be used to provide access to the first volume, the second volume, and the third volume, respectively. Further, or instead, with the controller 110 disposed therein, the fourth volume may be fluidically isolated from each of the first volume, the second volume, and/or the third volume by a roof or back wall of the cabinet to reduce the likelihood of exposing the controller 110 to one or more process fluids during installation, startup, regular operation, shutdown, maintenance, or repair that may compromise the operation of the controller 110.

While the first volume, the second volume, and the third volume have been described as having a negative pressure provided by the plurality of gas movers, the fourth volume may be in fluid communication with a fan operable to generate positive pressure in the fourth volume, relative to an environment outside of the fourth volume, to control the temperature of the controller 110 and/or other components within the fourth volume. Further, or instead, while the fourth volume has been described as housing the controller 110, the fourth volume may house all controls and power electronics for the system 102, as may be useful for reducing the likelihood that inadvertent sparking or overheating of one or more of such components can ignite a hydrogen-containing mixture in one or more of the first volume, the second volume, or the third volume.

In certain implementations, the controller 110 may further, or instead, monitor one or more ambient conditions in the first volume, the second volume, and the third volume to facilitate taking one or more remedial actions before an anomalous condition results in damage to the system 102 and/or to an area near the system 102. In particular, given the potential damage that may be caused by the presence of an ignitable hydrogen-containing mixture within the cabinet, the system 102 may include a plurality of gas sensors (referred to collectively as the plurality of gas sensors and individually as the first gas sensor, second gas sensor, or third gas sensor). Each one of the plurality of gas sensors may include any one or more of various different types of hydrogen sensors, such as one or more of optical fiber sensors, electrochemical hydrogen sensors, thin-film sensors, and the like. To facilitate robust detection of hydrogen within the cabinet, the first gas sensor may be disposed in the first volume, the second gas sensor may be disposed in the second volume, and the third gas sensor may be disposed in the third volume.

Each one of the plurality of gas sensors may be calibrated to detect hydrogen concentration levels below the ignition limit of hydrogen to facilitate taking remedial action before an ignition event can occur. Toward this end, the controller 110 may be in electrical communication with each one of the plurality of gas sensors, and the non-transitory computer-readable storage media of the controller 110 may have stored thereon instructions for causing one or more processors of the controller 110 to interrupt electrical communication between the power source 106 and equipment in the cabinet based on a signal, received from one or more of the plurality of gas sensors and indicative of a dangerous hydrogen concentration. Additionally, or alternatively, the signal received from the one or more of the plurality of gas sensors may be indicative of a rapid increase in hydrogen concentration.

While the controller 110 may be useful for taking remedial action with respect to potentially hazardous conditions in the cabinet, the system 102 may additionally, or alternatively, include one or more safety features useful for mitigating damage to the system 102 and/or in the vicinity of the system in the event of an explosion. For example, the system 102 may include a pressure relief valve in fluid communication with at least the third volume of the cabinet. The pressure relief valve may be a mechanical valve that is self-opening at a predetermined threshold pressure in the third volume. In some instances, the predetermined threshold pressure may be a pressure increase resulting from leakage of pressurized hydrogen into the third volume. Alternatively, the predetermined threshold pressure may be a high pressure associated with a rapid pressure rise associated with the combustion of a hydrogen-containing mixture. In each case, the pressure relief valve may vent contents of the third volume to the environment to mitigate damage that may otherwise occur.

Further, embodiments may include a water oxygen processing module 112, which includes a water circuit, separator, reservoir, pump, a gas mover 108, and a gas sensor. In general, the water circuit may optionally include a reservoir (e.g., a water tank) in fluid communication between a separator and a pump via respective fluid conduits. In certain implementations, the reservoir may be coupled to an external water source (e.g., water pipe, not shown) to receive a water supply suitable for meeting the demands of the electrochemical stack 104. The connection between the reservoir and the external water source may be made outside of the cabinet to facilitate connection of the system 102 to an industrial water supply and, in some instances, to reduce the likelihood of damaging equipment in one or more of the first volume, the second volume, or the third volume in the event of a leak in the connection between the external water source and the reservoir. The water circuit may include any of the various different types of equipment useful for managing the properties of the water flowing through the system 102. For example, the water circuit may include filtration or other processing equipment useful for the purification of process water to reduce the concentration of contaminants that may degrade the performance of other components (e.g., the electrochemical stack 104) over time. Additionally, or alternatively, the water circuit may include a heat exchanger (not shown) in thermal communication with one or more of the reservoir, the separator, or the pump to manage the temperature of each component and/or manage the temperature of water flowing through each component.

The pump may be in fluid communication with the electrochemical stack 104 via a feed conduit extending from the pump in the first volume to the first fluid connector of the system 102. The feed conduit may extend through the wall between the first and second volumes. In use, the pump may be powered to move purified water from the reservoir along the feed conduit extending from the first volume to the second volume and into the electrochemical stack 104 in the second volume. Thus, the pump may be operable to deliver purified water to the second volume while being partitioned from equipment in each second and third volumes. Such partitioning of the pump may be advantageous for, among other things, reducing the likelihood that heat generated by the pump during operation may serve as an ignition source for a hydrogen-containing mixture. For example, in the event of a hydrogen leak in the second and/or third volumes, an ignitable hydrogen-air mixture may inadvertently form in the second and/or third volumes. Continuing with this example, keeping the pump partitioned away from the second volume and the third volume may, therefore, reduce the likelihood that ignition can occur before the ignitable hydrogen-air mixture can be detected and the system safely shut down.

In some implementations, the water circuit may include a recirculation circuit in fluid communication between the first fluid connector and the separator. Through the fluid communication with the first fluid connector, the recirculation circuit may receive an exit flow consisting essentially of water and oxygen from the anode portion of the electrochemical stack 104. At least a portion of the recirculation circuit may extend from the second volume to the first volume through the wall to direct the flow of water and oxygen from the electrochemical stack 104 in the second volume to the separator in the first volume. By carrying oxygen to the separator in the first volume partitioned from the second volume, the recirculation circuit may reduce the likelihood that oxygen in the excess water flowing from the system 102 may inadvertently escape into the second volume and/or the third volume to form an ignitable mixture with hydrogen.

The separator may be any one or more of various different types of gas-liquid separators suitable for separating oxygen from excess water in the return flow moving through the recirculation circuit from the system 102. For example, the separator may comprise a dryer, a condenser, or another device that separates oxygen from excess water through gravity. The excess water settling along a bottom portion of the separator and oxygen collecting along a top portion of the separator. More generally, the separator may operate to separate oxygen from excess water without the use of power or moving parts that could otherwise act as potential ignition sources in the system 102. The oxygen collected by the separator may be directed out of the first volume to be vented to an environment outside of the cabinet or to be used as a process gas for another part of a plant. By way of example and not limitation, the oxygen collected by the separator may be removed from the separator using a suction pump or blower. The excess water collected by the separator may be directed to the reservoir to be circulated through the electrochemical stack 104 again. That is, more generally, the separator may remove oxygen from the cabinet at a position away from hydrogen-related equipment in the second volume and the third volume while facilitating efficient use of water in the formation of hydrogen.

Further, embodiments may include a water hydrogen processing module 114, which includes a hydrogen circuit, a dryer, and a hydrogen pump. The hydrogen circuit may include a product conduit and a dryer in fluid communication with one another. More specifically, the product conduit may extend through the wall between the second volume and the third volume. The product conduit may be in fluid communication between the inlet portion of the dryer and the second fluid connector of the system 102. Thus, in use, a product stream consisting essentially of hydrogen and water (e.g., water vapor) may move from the anode side of the electrochemical stack 104 to the inlet portion of the dryer via the second fluid connector and the product conduit. As compared to the mixture of oxygen and excess water in the exit flow from the anode portion of the electrochemical stack 104 into the recirculation circuit, the product stream may be at a higher pressure. To reduce the likelihood of hydrogen leaking into the third volume, the connections between the product conduit and each of the second fluid connector and the dryer may include gas-tight seals.

The dryer may be, for example, pressure swing adsorption (PSA), a temperature swing adsorption (TSA) system, or a hybrid PSA-TSA system. The dryer may include one or more beds of a water-adsorbent material, such as activated carbon, silica, zeolite, or alumina. As the product mixture consisting essentially of hydrogen and water moves through from the inlet portion to an outlet portion of the dryer, at least a portion of the water may be removed from the product mixture through adsorption of either water or hydrogen in the bed of water-adsorbent material. If hydrogen is adsorbed, then it is removed into the outlet conduit during a pressure and/or temperature swing cycle. If water is adsorbed, then it is removed into a pump conduit during the pressure and/or temperature swing cycle. In some instances, adsorption carried out by the dryer may be passive, without the addition of heat or electricity that could otherwise act as ignition sources of an ignitable hydrogen-containing mixture. In such instances, however, considerations related to backpressure created by the dryer in fluid communication with the electrochemical stack 104 may limit the size and, therefore, the single-pass effectiveness of the dryer in removing moisture from the product stream.

At least in view of such considerations related to the single-pass effectiveness of the dryer, the hydrogen circuit may further, or instead, include a hydrogen pump in fluid communication between the outlet portion and the inlet portion of the dryer to recirculate the product mixture of hydrogen and water for additional passes through the dryer. For example, the dryer may direct dried hydrogen from the outlet portion of the dryer to an outlet conduit that directs the dried hydrogen to a downstream process or storage in an environment outside of the cabinet. Further, or instead, the dryer may direct a portion of the product stream that has not adequately dried from the outlet portion of the dryer to a pump conduit in fluid communication with the hydrogen pump. In certain instances, at least a portion of the water in the product mixture moving along the pump conduit may condense out of the product mixture and collect in a moisture trap in fluid communication with the pump conduit before reaching the hydrogen pump. Such moisture condensed in the moisture trap may be collected and/or directed to an environment outside of the cabinet.

The hydrogen pump may be, for example, an electrochemical pump. As used in this context, an electrochemical pump shall be understood to include a proton exchange membrane (i.e., a PEM electrolyte) disposed between an anode and a cathode. The hydrogen pump may generate protons moveable from the anode through the proton exchange membrane to the cathode form pressurized hydrogen. Thus, such an electrochemical pump may be particularly useful for recirculating hydrogen within the hydrogen circuit at least because the electrochemical pumping provided by the electrochemical pump separates hydrogen from water in the mixture delivered to the hydrogen pump via the pump conduit while also pressurizing the separated hydrogen to facilitate moving the pressurized hydrogen to the inlet portion of the dryer.

Alternatively, the hydrogen pump may comprise another hydrogen pumping and/or separation device, such as a diaphragm compressor or blower or a metal-hydride separator (e.g., which selectively adsorbs hydrogen) which may be used in combination with or instead of the electrochemical hydrogen pump. In one embodiment, a plurality of stages of hydrogen pumping and/or re-pressurization may be used. Each stage may comprise one or more of the diaphragm compressor or blower, the electrochemical pump, or the metal-hydride separator. In one implementation, the stages may be in a cascade (i.e., series) configuration and/or may be located in separate enclosures.

In certain implementations, the hydrogen pump may be in fluid communication with the moisture trap, where the water separated from hydrogen in the hydrogen pump may be collected and/or directed to an environment outside of the cabinet. Additionally, or alternatively, the pressurized hydrogen formed by the hydrogen pump may be directed along a recovery circuit in fluid communication between the hydrogen pump and the inlet portion of the dryer (e.g., via mixing with the product stream in the product conduit) to recirculate the pressurized hydrogen to the dryer. Among other advantages, recirculating the pressurized hydrogen through the dryer in this way facilitates moving hydrogen out of the cabinet through only a single conduit (e.g., the outlet conduit), which may reduce potential failure modes as compared to the use of multiple exit points.

Further, embodiments may include comms 116 or communication network may be a wired and/or a wireless network. The comms 116, if wireless, may be implemented using communication techniques, such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The comms 116 may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance.

Further, embodiments may include one or up to N storage tanks 118, which may include a plurality of hydrogen storage tanks to contain the hydrogen created from the system 102. The storage tank 118 may be used to store excess hydrogen created by the system 102 to be used or shipped to users at a later time. The storage tank 118 may be used to contain hydrogen until shipped to users, such as industrial outputs, for example, refinery uses, iron or steel reduction uses, concrete production uses, ammonia synthesis uses, hydrogenated oils uses, other chemical plant type uses, etc.

Further, embodiments may include a base module 120, which begins by initiating the system module 122. For example, the system module 122 begins by being initiated by the base module 120. Then the system module 122 connects to the data collection module 134. Then the system module 122 is continuously polling for a request for the data stored in the system database 126 from the data collection module 134. The system module 122 receives the request from the data collection module 134 for the data stored in the system database 126. Then the system module 122 sends the data stored in the system database 126 to the data collection module 134. The system module 122 returns to the base module 120. Then the base module 120 initiates the controller module 124. For example, the controller module 124 begins by being initiated by the base module 120. Then the controller module 124 is continuously polling for the frequency adjustment from the droop module 136. The controller module 124 determines if the frequency adjustment from the droop module 136 was received. If it is determined that the frequency adjustment was received, the controller module 124 receives the frequency adjustment from the droop module 136. Then the controller module 124 sends the frequency adjustment to the controller 110. If it is determined that the frequency adjustment was not received or after the frequency adjustment was sent to the controller, the controller module 124 returns to the base module 120.

Further, embodiments may include a system module 122, which begins by being initiated by the base module 120. Then the system module 122 connects to the data collection module 134. Then the system module 122 is continuously polling for a request for the data stored in the system database 126 from the data collection module 134. The system module 122 receives the request from the data collection module 134 for the data stored in the system database 126. Then the system module 122 sends the data stored in the system database 126 to the data collection module 134. The system module 122 returns to the base module 120.

Further, embodiments may include a controller module 124, which begins by being initiated by the base module 120. Then the controller module 124 is continuously polling for the frequency adjustment from the droop module 136. The controller module 124 determines if the frequency adjustment from the droop module 136 was received. If it is determined that the frequency adjustment was received the controller module 124 receives the frequency adjustment from the droop module 136. Then the controller module 124 sends the frequency adjustment to the controller 110. If it is determined that the frequency adjustment was not received or after the frequency adjustment was sent to the controller the controller module 124 returns to the base module 120.

Further, embodiments may include a system database 126, which contains power data related to the electrochemical stack 104, which provides the electrochemical network 130 a conversion table of a plurality of incoming frequencies from the power source 106 and the outputted frequency to the electrochemical stack 104 to take into account the frequency droop. The frequency droop may be a control mode used for AC electrical power generators, whereby the power output of a generator reduces as the line frequency increases. It is commonly used as the speed control mode of the governor of a prime mover driving a synchronous generator connected to an electrical grid. It works by controlling the rate of power produced by the prime mover according to the grid frequency. With droop speed control, when the grid is operating at the maximum operating frequency, the prime mover's power is reduced to zero, and when the grid is at the minimum operating frequency, the power is set to 100%, and intermediate values at other operating frequencies. This mode allows synchronous generators to run in parallel so that loads are shared among generators with the same droop curve in proportion to their power rating. In practice, the droop curves that are used by generators on large electrical grids are not necessarily linear or the same and may be adjusted by operators. This permits the ratio of power used to vary depending on load. For example, base load generators will generate a larger proportion at low demand. Stability requires that the power output is a monotonically decreasing function of frequency over the operating frequency range.

Grid storage systems can also use droop speed control. With droop speed control, those systems will remove energy from the grid at higher than average frequencies and supply it at lower frequencies. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

Further, embodiments may include a cloud 128 that may be a wired and/or a wireless network. The cloud 128, if wireless, may be implemented using communication techniques, such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The cloud 128 may allow ubiquitous access to shared pools of configurable system resources and higher-level services that can be rapidly provisioned with minimal management effort, often over the Internet, and relies on sharing of resources to achieve coherence and economies of scale like a public utility. In contrast, third-party clouds enable organizations to focus on their core businesses instead of expending resources on computer infrastructure and maintenance.

Further, embodiments may include an electrochemical network 130, which connects to the system 102, and the customer network 144, collects data from the system 102 and the customer network 144, and stores the collected data. In some embodiments, the electrochemical network 130 may determine cost-efficient times to produce hydrogen through a customer's system 102 and send a notification to the system 102 to generate hydrogen using the most cost-efficient power source.

Further, embodiments may include an E.N. base module 132, which begins by initiating the data collection module 134. For example, the data collection module 134 begins by being initiated by the E.N. base module 132. The data collection module 134 connects to the system module 122. Then the data collection module 134 sends a request to the system module 122 for the data stored in the system database 126. The data collection module 134 is continuously polling to receive the data stored in the system database 126 from the system module 122. The data collection module 134 receives the data stored in the system database 126 from the system module 122. Then the data collection module 134 stores the received data in the stack database 138. The data collection module 134 connects to the customer module 148. Then the data collection module 134 sends a request to the customer module 148 for the data stored in the hydrogen database 150. The data collection module 134 is continuously polling to receive the data stored in the hydrogen database 150 from the customer module 148. The data collection module 134 receives the data stored in the hydrogen database 150 from the customer module 148. Then the data collection module 134 stores the received data in the customer database 140. The data collection module 134 returns to the E.N. base module 132.

The E.N. base module 132 then initiates the droop module 136. For example, the droop module 136 begins by being initiated by the E.N. base module 132. The droop module 136 sends a request to the power source 106 for the power data. Then the droop module 136 receives the power data from the power source 106. The droop module 136 extracts the frequency and the load percentage from the customer database 140. The droop module 136 compares the extracted frequency and the load percentage to the stack database 138. Then the droop module 136 determines if a frequency adjustment is required. If it is determined that a frequency adjustment is required, then the droop module 136 determines the frequency adjustment. Then the droop module 136 sends the frequency adjustment to the controller module 124. If it is determined that a frequency adjustment is not required or after the frequency adjustment is sent to the controller module 124, the droop module 136 returns to the E.N. base module 132.

Further, embodiments may include a data collection module 134, which begins by being initiated by the E.N. base module 132. The data collection module 134 connects to the system module 122. Then the data collection module 134 sends a request to the system module 122 for the data stored in the system database 126. The data collection module 134 is continuously polling to receive the data stored in the system database 126 from the system module 122. The data collection module 134 receives the data stored in the system database 126 from the system module 122. Then the data collection module 134 stores the received data in the stack database 138. The data collection module 134 connects to the customer module 148. Then the data collection module 134 sends a request to the customer module 148 for the data stored in the hydrogen database 150. The data collection module 134 is continuously polling to receive the data stored in the hydrogen database 150 from the customer module 148. The data collection module 134 receives the data stored in the hydrogen database 150 from the customer module 148. Then the data collection module 134 stores the received data in the customer database 140. The data collection module 134 returns to the E.N. base module 132.

Further, embodiments may include a droop module 136, which begins by being initiated by the E.N. base module 132. The droop module 136 sends a request to the power source 106 for the power data. Then the droop module 136 receives the power data from the power source 106. The droop module 136 extracts the frequency and the load percentage from the customer database 140. The droop module 136 compares the extracted frequency and the load percentage to the stack database 138. Then the droop module 136 determines if a frequency adjustment is required. If it is determined that a frequency adjustment is required, then the droop module 136 determines the frequency adjustment. Then the droop module 136 sends the frequency adjustment to the controller module 124. If it is determined that a frequency adjustment is not required or after the frequency adjustment is sent to the controller module 124, the droop module 136 returns to the E.N. base module 132.

Further, embodiments may include a stack database 138, which contains power data related to the electrochemical stack 104, which provides the electrochemical network 130 a conversion table of a plurality of incoming frequencies from the power source 106 and the outputted frequency to the electrochemical stack 104 to take into account the frequency droop. The frequency droop may be a control mode used for AC electrical power generators, whereby the power output of a generator reduces as the line frequency increases. It is commonly used as the speed control mode of the governor of a prime mover driving a synchronous generator connected to an electrical grid. It works by controlling the rate of power produced by the prime mover according to the grid frequency. With droop speed control, when the grid is operating at the maximum operating frequency, the prime mover's power is reduced to zero, and when the grid is at the minimum operating frequency, the power is set to 100%, and intermediate values at other operating frequencies. This mode allows synchronous generators to run in parallel so that loads are shared among generators with the same droop curve in proportion to their power rating. In practice, the droop curves that are used by generators on large electrical grids are not necessarily linear or the same and may be adjusted by operators. This permits the ratio of power used to vary depending on load. For example, base load generators will generate a larger proportion at low demand. Stability requires that the power output is a monotonically decreasing function of frequency over the operating frequency range. Grid storage systems can also use droop speed control. With droop speed control, those systems will remove energy from the grid at higher than average frequencies and supply it at lower frequencies. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

Further, embodiments may include a customer database 140, which contains the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

Further, embodiments may include comms 142, that may be a wired and/or a wireless network. The comms 142 or communication network, if wireless, may be implemented using communication techniques, such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The comms 142 may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance.

Further, embodiments may include a customer network 144, which allows the users or customers to input their hydrogen requests to the system 102 through the C.N. base module 146. The customer network 144 allows the customers or users to share information or data with the system 102 and electrochemical network 130.

Further, embodiments may include a C.N. base module 146 that continuously polls for user input. For example, the user input may be the customer's hydrogen request for the day, such as 600 kg of hydrogen that the customer requires, and the production rate, such as 6 kg of hydrogen per hour per electrochemical stack 104 activated, the load that the electrochemical stack 104 requires, such as 100% to maintain the hydrogen production rate, and the frequency required by the electrochemical stack 104. In some embodiments, the user inputs may be inputted throughout the day, for the entire day, week, month, quarter, year, year, etc. In some embodiments, the user inputs may be sent to the system 102 in order to let the system 102 know how much hydrogen needs to be produced and informs the system 102 how long the electrochemical stacks 104 should be activated for. Then the user inputs the hydrogen request. The C.N. base module 146 stores the hydrogen request in the hydrogen database 150. Then the C.N. base module 146 initiates the customer module 148.

Further, embodiments may include a customer module 148, which begins by being initiated by the C.N. base module 146. Then the customer module 148 is continuously polling for a request from the data collection module 134 for the data stored in the hydrogen database 150. The customer module 148 receives a request for the data stored in the hydrogen database 150 from the data collection module 134. Then the customer module 148 sends the data stored in the hydrogen database 150 to the data collection module 134. For example, the customer module 136 sends the requested data to the data collection module 134, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc. The customer module 148 returns to the C.N. base module 146.

Further, embodiments may include a hydrogen database 150, which contains the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

Further, embodiments may include comms 152 may be a wired and/or a wireless network. The comms 152, if wireless, may be implemented using communication techniques, such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The comms 152 may allow ubiquitous access to shared pools of configurable system resources and higher-level services that can be rapidly provisioned with minimal management effort, often over the Internet, and relies on sharing of resources to achieve coherence and economies of scale, like a public utility, while third-party clouds enable organizations to focus on their core businesses instead of expending resources on computer infrastructure and maintenance.

Figure 2:
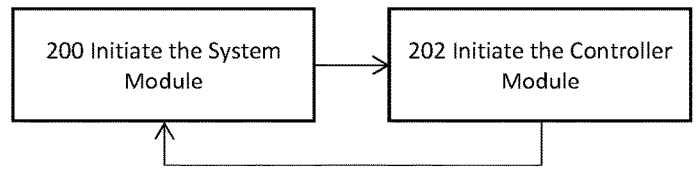
FIG. 2 is a flowchart of a process performed by a base module, according to an embodiment.

FIG. 2 is a flowchart of a process performed by the base module 120. The process begins with the base module 120 initiating, at step 200, the system module 122. The system module 122 then connects to the data collection module 134. The system module 122 is continuously polling for a request for the data stored in the system database 126 from the data collection module 134. The system module 122 receives the request from the data collection module 134 for the data stored in the system database 126. Then, the system module 122 sends the data stored in the system database 126 to the data collection module 134. The system module 122 returns to the base module 120.

At step 202, the base module 120 initiates the controller module 124. The controller module 124 is continuously polling for the frequency adjustment from the droop module 136. The controller module 124 determines if the frequency adjustment from the droop module 136 was received. If so, the controller module 124 sends the frequency adjustment to the controller 110. If it is determined that the frequency adjustment was not received or after the frequency adjustment was sent to the controller 110, the controller module 124 returns to the base module 120.

Figure 3:
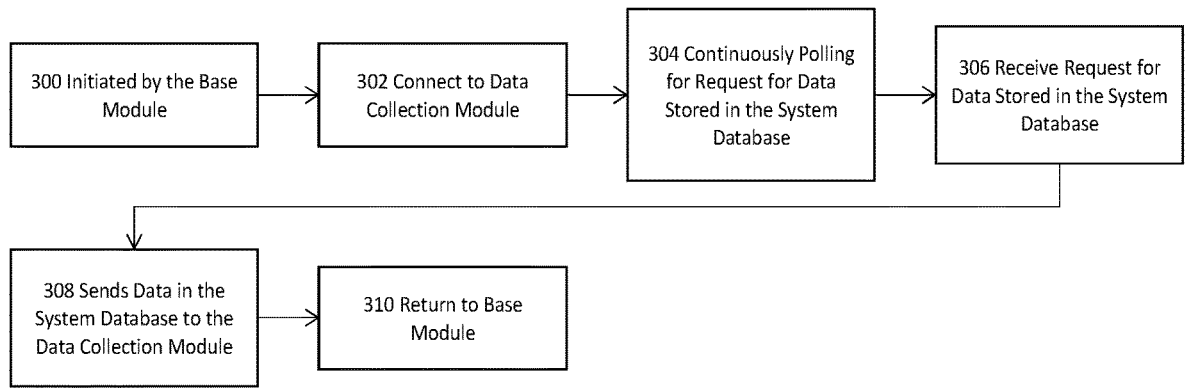
FIG. 3 is a flowchart of a process performed by a system module, according to an embodiment.

FIG. 3 is a flowchart of a process performed by the system module 122. The process begins with the system module 122 being initiated, at step 300, by the base module 120. The system module 122 then connects, at step 302, to the data collection module 134. The system module 122 is continuously polling, at step 304, for a request for the data stored in the system database 126 from the data collection module 134. For example, the system module 122 is continuously polling to receive a request from the data collection module 134 for the data stored in the system database 126. The system database 126 contains power data related to the electrochemical stack 104, which provides the electrochemical network 130 with a conversion table of a plurality of incoming frequencies from the power source 106 and the outputted frequency to the electrochemical stack 104 to take into account the frequency droop. The frequency droop may be a control mode used for AC electrical power generators, whereby the power output of a generator reduces as the line frequency increases. It is commonly used as the speed control mode of the governor of a prime mover driving a synchronous generator connected to an electrical grid. It works by controlling the rate of power produced by the prime mover according to the grid frequency. With droop speed control, when the grid is operating at the maximum operating frequency, the prime mover's power is reduced to zero, and when the grid is at the minimum operating frequency, the power is set to 100%, and intermediate values at other operating frequencies. This mode allows synchronous generators to run in parallel so that loads are shared among generators with the same droop curve in proportion to their power rating. In practice, the droop curves that are used by generators on large electrical grids are not necessarily linear or the same and may be adjusted by operators. This permits the ratio of power used to vary depending on load. For example, base load generators will generate a larger proportion at low demand. Stability requires that the power output is a monotonically decreasing function of frequency over the operating frequency range. Grid storage systems can also use droop speed control. With droop speed control, those systems will remove energy from the grid at higher than average frequencies and supply it at lower frequencies.

The system database 126 contains information regarding the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%. The system module 122 receives, at step 306, the request from the data collection module 134 for the data stored in the system database 126. For example, the system module 122 receives a request for the data, such as the incoming power from the power source 106, such as 63 Hz, the load percentage required by the electrochemical stack 104, such as 100%, the power to the electrochemical stack 104 taking into account the frequency droop, such as 60 Hz, the droop percentage of the incoming frequency from the power source 106 to the frequency into the electrochemical stack 104, such as 5%. Then the system module 122 sends, at step 308, the data stored in the system database 126 to the data collection module 134. For example, the system module 122 sends the data to the data collection module 134, such as the incoming power from the power source 106, such as 63 Hz, the load percentage required by the electrochemical stack 104, such as 100%, the power to the electrochemical stack 104 taking into account the frequency droop, such as 60 Hz, the droop percentage of the incoming frequency from the power source 106 to the frequency into the electrochemical stack 104, such as 5%. The system module 122 returns, at step 310, to the base module 120.

Figure 4:
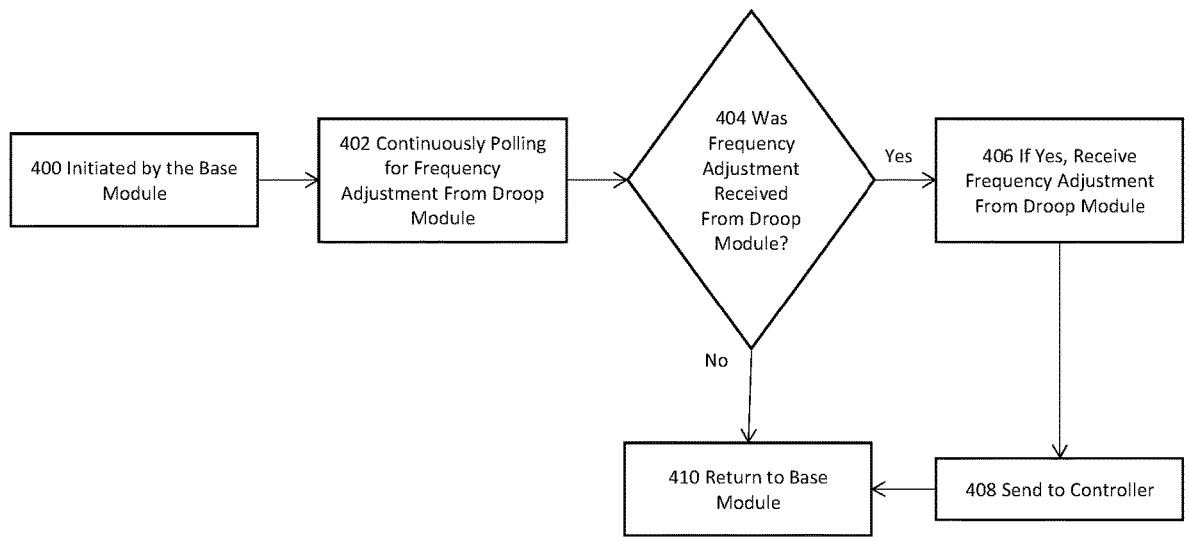
FIG. 4 is a flowchart of a process performed by a controller module, according to an embodiment.

FIG. 4 is a flowchart of a process performed by the controller module 124. The process begins with the controller module 124 being initiated, at step 400, by the base module 120. The controller module 124 is then continuously polling, at step 402, for the frequency adjustment from the droop module 136. For example, the controller module 124 is continuously polling for an adjustment from the droop module 136, such as an increase or decrease of frequency being sent to the electrochemical stack 104 from the power source 106. In some embodiments, the frequency adjustment may be determined if the customer inputs to increase or decrease the hydrogen production rate, resulting in an increase or decrease of frequency. The controller module 124 determines, at step 404, if the frequency adjustment from the droop module 136 was received. If it is determined that the frequency adjustment was received, the controller module 124 receives, at step 406, the frequency adjustment from the droop module 136. For example, suppose the power data received by the power source 106 was 63 Hz, and the customer inputted data was a frequency of 63 Hz required by the electrochemical stack 104 and the load percentage for the electrochemical stack 104, such as 100%. In that case, a frequency adjustment is required, and the inputted power would need to increase, for example, to 66 Hz to maintain the hydrogen production rate. Another example may be if the power data received by the power source 106 was 66 Hz and customer inputted data was a frequency of 63 Hz required by the electrochemical stack 104 and the load percentage for the electrochemical stack 104, such as 100%. A frequency adjustment is required, and the inputted power would need to decrease, for example, to 63 Hz to maintain the hydrogen production rate, and a signal would be sent to the controller module 124 to adjust the frequency.

At step 408, the controller module 124 sends the frequency adjustment to the controller 110. For example, the controller module 124 sends the new frequency to the controller 110 to either increase or decrease the frequency input into the electrochemical stack 104. In some embodiments, if the frequency adjustment increases power, the controller 110 may utilize an additional power source 106, such as another battery, to increase the frequency being provided to the electrochemical stack 104. If it is determined that the frequency adjustment was not received or after the frequency adjustment was sent to the controller the controller module 124 returns, at step 410, to the base module 120.

FIG. 5 illustrates an embodiment of the system database 126. The system database 126 contains power data related to the electrochemical stack 104, which provides the electrochemical network 130 with a conversion table of a plurality of incoming frequencies from the power source 106 and the outputted frequency to the electrochemical stack 104 to take into account the frequency droop. The frequency droop may be a control mode used for AC electrical power generators, whereby the power output of a generator reduces as the line frequency increases. It is commonly used as the speed control mode of the governor of a prime mover driving a synchronous generator connected to an electrical grid. It works by controlling the rate of power produced by the prime mover according to the grid frequency. With droop speed control, when the grid is operating at the maximum operating frequency, the prime mover's power is reduced to zero, and when the grid is at the minimum operating frequency, the power is set to 100%, and intermediate values at other operating frequencies. This mode allows synchronous generators to run in parallel so that loads are shared among generators with the same droop curve in proportion to their power rating. In practice, the droop curves that are used by generators on large electrical grids are not necessarily linear or the same and may be adjusted by operators. This permits the ratio of power used to vary depending on load. For example, base load generators will generate a larger proportion at low demand. Stability requires that the power output is a monotonically decreasing function of frequency over the operating frequency range. Grid storage systems can also use droop speed control. With droop speed control, those systems will remove energy from the grid at higher than average frequencies and supply it at lower frequencies. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

FIG. 6 is a flowchart of a process performed by the E.N. base module 132. The process begins with the E.N. base module 132 initiating, at step 600, the data collection module 134. The data collection module 134 connects to the system module 122. Then, the data collection module 134 sends a request to the system module 122 for the data stored in the system database 126. The data collection module 134 is continuously polling to receive the data stored in the system database 126 from the system module 122. The data collection module 134 receives the data stored in the system database 126 from the system module 122. The data collection module 134 then stores the received data in the stack database 138. The data collection module 134 connects to the customer module 148. The data collection module 134 sends a request to the customer module 148 for the data stored in the hydrogen database 150. The data collection module 134 is continuously polling to receive the data stored in the hydrogen database 150 from the customer module 148. The data collection module 134 receives the data stored in the hydrogen database 150 from the customer module 148. Then, the data collection module 134 stores the received data in the customer database 140. The data collection module 134 returns to the E.N. base module 132.

At step 602, the E.N. base module 132 initiates the droop module 136. The droop module 136 sends a request to the power source 106 for the power data. Then, the droop module 136 receives the power data from the power source 106. The droop module 136 extracts the frequency and the load percentage from the customer database 140. The droop module 136 compares the extracted frequency and the load percentage to the stack database 138. The droop module 136 determines if a frequency adjustment is required. If it is determined that a frequency adjustment is required, the droop module 136 determines the frequency adjustment. The droop module 136 then sends the frequency adjustment to the controller module 124. If it is determined that a frequency adjustment is not required or after the frequency adjustment is sent to the controller module 124, the droop module 136 returns to the E.N. base module 132.

FIG. 7 is a flowchart of a process performed by the data collection module 134. The process begins with the data collection module 134 being initiated, at step 700, by the E.N. base module 132. The data collection module 134 connects, at step 702, to the system module 122. Then, the data collection module 134 sends, at step 704, a request to the system module 122 for the data stored in the system database 126. For example, the data collection module 134 is sending a request to receive data, such as power data related to the electrochemical stack 104, which provides the electrochemical network 130 with a conversion table of a plurality of incoming frequencies from the power source 106 and the outputted frequency to the electrochemical stack 104 to take into account the frequency droop. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%. The data collection module 134 is continuously polling, at step 706, to receive the data stored in the system database 126 from the system module 122. For example, the data collection module 134 is continuously polling to receive the data, such as power data related to the electrochemical stack 104, which provides the electrochemical network 130 a conversion table of a plurality of incoming frequencies from the power source 106 and the outputted frequency to the electrochemical stack 104 to take into account the frequency droop. The database contains the incoming power from the power source 106, such 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

At step 708, the data collection module 134 receives the data stored in the system database 126 from the system module 122. For example, the data collection module 134 receives the data from the system module 122, such as power data related to the electrochemical stack 104, which provides the electrochemical network 130 with a conversion table of a plurality of incoming frequencies from the power source 106 and the outputted frequency to the electrochemical stack 104 to take into account the frequency droop. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

At step 710, the data collection module 134 stores the received data in the stack database 138. For example, the data collection module stores the data in the stack database 138, such as power data related to the electrochemical stack 104, which provides the electrochemical network 130 with a conversion table of a plurality of incoming frequencies from the power source 106 and the outputted frequency to the electrochemical stack 104 to take into account the frequency droop. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

At step 712, the data collection module 134 connects to the customer module 148. Then, the data collection module 134 sends, at step 714, a request to the customer module 148 for the data stored in the hydrogen database 150. For example, the data collection module 134 is sending a request to receive data, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 716, the data collection module 134 is continuously polling to receive the data stored in the hydrogen database 150 from the customer module 148. For example, the data collection module 134 is continuously polling to receive the data, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 718, the data collection module 134 receives the data stored in the hydrogen database 150 from the customer module 148. For example, the data collection module 134 receives the data from the customer module 148, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 720, the data collection module 134 stores the received data in the customer database 140. For example, the data collection module stores the data in the customer database 140, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc. The data collection module 134 returns, at step 722, to the E.N. base module 132.

FIG. 8 is a flowchart of a process performed by the droop module 136. The process begins with the droop module 136 being initiated, at step 800, by the E.N. base module 132. The droop module 136 sends, at step 802, a request to the power source 106 for the power data. For example, the power data may be the frequency being inputted into the system 102, such as the frequency or voltage being provided to the system 102. The power source may be AC energy resources, such as the power grid, wind turbines, solar farms, energy storage, and conventional energy resources, e.g., nuclear power stations, gas power plants, etc. Also, the power source 106 may include DC energy resources, such as wind turbines, solar photovoltaic arrays, energy store, DC power grids, etc. In some embodiments, the received power may be collected by a generator in the system 102.

At step 804, the droop module 136 receives the power data from the power source 106. For example, the power data may be the frequency being inputted into the system 102, such as the frequency or voltage being provided to the system 102. The power source may be AC energy resources, such as the power grid, wind turbines, solar farms, energy storage, and conventional energy resources such as nuclear power stations, gas power plants, etc. Also, the power source 106 may include DC energy resources, such as wind turbines, solar photovoltaic arrays, energy store, DC power grids, etc. In some embodiments, the received power may be collected by a generator in the system 102.

At step 806, the droop module 136 extracts the frequency and the load percentage from the customer database 140 (FIG. 10). For example, the droop module 136 may extract the frequency needed by the electrochemical stack 104, such as 60 Hz, and the load percentage required for the electrochemical stack 104, such as 100%. The droop module 136 compares, at step 808, the extracted frequency and the load percentage to the stack database 138 (FIG. 9). For example, the droop module 136 compares the extracted frequency of 60 Hz required by the electrochemical stack 104 and the load percentage for the electrochemical stack 104, such as 100%, to the stack database 138, which provides the necessary inputted frequency from the power source 106.

At step 810, the droop module 136 determines if a frequency adjustment is required. For example, if the frequency of the grid frequency is 63 Hz, the reference frequency is 60 Hz and the droop setting is 5% (3 Hz frequency deviation causing 100% adjustment in power consumption/hydrogen production), the electrolyzers shall increase the power consumption by 100% (if they can) to support adjusting the grid frequency. If the reference frequency is 60 Hz and the grid frequency is 60 Hz, no adjustment in the power consumption/hydrogen production is needed. As a further example, if the power data received by the power source 106 was 63 Hz and the extracted data from the customer database 140 was a frequency of 60 Hz required by the electrochemical stack 104 and the load percentage for the electrochemical stack 104, such as 100%, then the comparison in the previous step would determine that a frequency adjustment was not required. However, if the power data received by the power source 106 were 63 Hz and the extracted data from the customer database 140 was a frequency of 63 Hz required by the electrochemical stack 104 and the load percentage for the electrochemical stack 104, such as 100%, then the comparison in the previous step would determine that a frequency adjustment is required. The inputted power would need to increase, for example, to 66 Hz to maintain the hydrogen production rate, and a signal would be sent to the controller module 124 to adjust the frequency. Also, if the power data received by the power source 106 were 66 Hz and the extracted data from the customer database 140 was a frequency of 63 Hz required by the electrochemical stack 104 and the load percentage for the electrochemical stack 104, such as 100%, then the comparison in the previous step would determine that a frequency adjustment is required. The inputted power would need to decrease, for example, to 63 Hz to maintain the hydrogen production rate, and a signal would be sent to the controller module 124 to adjust the frequency. If it is determined that a frequency adjustment is required, then the droop module 136 determines, at step 812, the frequency adjustment. For example, if the power data received by the power source 106 were 63 Hz and the extracted data from the customer database 140 was a frequency of 63 Hz required by the electrochemical stack 104 and the load percentage for the electrochemical stack 104, such as 100%, then the comparison in the previous step would determine that a frequency adjustment is required. The inputted power would need to increase, for example, to 66 Hz to maintain the hydrogen production rate, and a signal would be sent to the controller module 124 to adjust the frequency. Another example may be if the power data received by the power source 106 was 66 Hz and the extracted data from the customer database 140 was a frequency of 63 Hz required by the electrochemical stack 104 and the load percentage for the electrochemical stack 104, such as 100%. The comparison in the previous step would determine that a frequency adjustment is required and the inputted power would need to decrease, for example, to 63 Hz to maintain the hydrogen production rate, and a signal would be sent to the controller module 124 to adjust the frequency.

At step 814, the droop module 136 sends the frequency adjustment to the controller module 124. For example, the droop module 136 sends the frequency adjustment, such as an increase or decrease, to the controller module 124. In some embodiments, the frequency adjustment may be determined if the customer inputs to increase or decrease the hydrogen production rate, resulting in an increase or decrease of frequency. If it is determined that a frequency adjustment is not required or after the frequency adjustment is sent to the controller module 124, the droop module 136 returns, at step 816, to the E.N. base module 132.

FIG. 9 illustrates an embodiment of the stack database 138. The stack database 138 contains power data related to the electrochemical stack 104, which provides the electrochemical network 130 with a conversion table of a plurality of incoming frequencies from the power source 106 and the outputted frequency to the electrochemical stack 104 to take into account the frequency droop. The frequency droop may be a control mode used for AC electrical power generators, whereby the power output of a generator reduces as the line frequency increases. It is commonly used as the speed control mode of the governor of a prime mover driving a synchronous generator connected to an electrical grid. It works by controlling the rate of power produced by the prime mover according to the grid frequency. With droop speed control, when the grid is operating at the maximum operating frequency, the prime mover's power is reduced to zero, and when the grid is at the minimum operating frequency, the power is set to 100%, and intermediate values at other operating frequencies. This mode allows synchronous generators to run in parallel so that loads are shared among generators with the same droop curve in proportion to their power rating. In practice, the droop curves that are used by generators on large electrical grids are not necessarily linear or the same and may be adjusted by operators. This permits the ratio of power used to vary depending on load. For example, base load generators will generate a larger proportion at low demand. Stability requires that the power output is a monotonically decreasing function of frequency over the operating frequency range. Grid storage systems can also use droop speed control. With droop speed control, those systems will remove energy from the grid at higher than average frequencies and supply it at lower frequencies. The database contains the incoming power from the power source 106, such as 63 Hz, the load percentage required by the electrochemical stack 104, such as 100%, the power to the electrochemical stack 104, taking into account the frequency droop, such as 60 Hz, the droop percentage of the incoming frequency from the power source 106 to the frequency into the electrochemical stack 104, such as 5%.

FIG. 10 illustrates an embodiment of the customer database 140. The customer database 140 contains the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

FIG. 11 is a flowchart of a process performed by the C.N. base module 146. The process begins with the C.N. base module 146 continuously polling, at step 1100, for the user input. For example, the user input may be the customer's hydrogen request for the day, such as 600 kg of hydrogen that the customer requires, and the production rate, such as 6 kg of hydrogen per hour per electrochemical stack 104 activated, the load that the electrochemical stack 104 requires, such as 100% to maintain the hydrogen production rate, and the frequency required by the electrochemical stack 104. In some embodiments, the user inputs may be inputted throughout the day, for the entire day, week, month, quarter, year, year, etc. In some embodiments, the user inputs may be sent to the system 102 in order to let the system 102 know how much hydrogen needs to be produced and informs the system 102 how long the electrochemical stacks 104 should be activated for.

At step 1102, the user inputs the hydrogen request. For example, the user input may be the customer's hydrogen request for the day, such as 600 kg of hydrogen that the customer requires, and the production rate, such as 6 kg of hydrogen per hour per electrochemical stack 104 activated, the load that the electrochemical stack 104 requires, such as 100% to maintain the hydrogen production rate, and the frequency required by the electrochemical stack 104. In some embodiments, the user inputs may be inputted throughout the day, for the entire day, week, month, quarter, year, year, etc. In some embodiments, the user inputs may be sent to the system 102 in order to let the system 102 know how much hydrogen needs to be produced and informs the system 102 how long the electrochemical stacks 104 should be activated for.

At step 1104, the C.N. base module 146 stores the hydrogen request in the hydrogen database 150. For example, the data that might be stored in the hydrogen database 150 may be the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 1106, the C.N. base module 146 initiates the customer module 148. For example, the customer module 148 begins by being initiated by the C.N. base module 146. Then the customer module 148 is continuously polling for a request from the voltage module 136 for the data stored in the hydrogen database 150. The customer module 148 receives a request for the data stored in the hydrogen database 150 from the voltage module 136. Then the customer module 148 sends the data stored in the hydrogen database 150 to the voltage module 136. The customer module 148 returns to the C.N. base module 146.

FIG. 12 is a flowchart of a process performed by the customer module 148. The process begins with the customer module 148 being initiated, at step 1200, by the C.N. base module 146. The customer module 148 is continuously polling, at step 1202, for a request from the data collection module 134 for the data stored in the hydrogen database 150. For example, the customer module 148 is continuously polling to receive a request for data, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 1204, the customer module 148 receives a request for the data stored in the hydrogen database 150 from the data collection module 134. For example, the customer module 148 receives a request from the data collection module 134 for data, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

At step 1206, the customer module 148 sends the data stored in the hydrogen database 150 to the data collection module 134. For example, the customer module 136 sends the requested data to the data collection module 134, such as the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc. The customer module 148 returns, at step 1208, to the C.N. base module 146.

FIG. 13 illustrates an embodiment of the hydrogen database 150. The hydrogen database 150 contains the customer's name, such as client 1, the total number of electrochemical stacks 104 the client has within their system 102, the hydrogen request, such as 600 kg of hydrogen, the hydrogen production required from each electrochemical stack 104, such as 6 kg of hydrogen per hour per electrochemical stack 104, the load percentage, such as 100% of the load required for the electrochemical stack 104, the frequency required for the electrochemical stack 104, such as 60 Hz, the number of electrochemical stacks needed to complete the hydrogen request, the date, and the time. In some embodiments, the database may contain a customer ID, the customer's location, the number of active electrochemical stacks, and the number of electrochemical stacks that are not active. In some embodiments, the hydrogen request may be daily, hourly, weekly, monthly, quarterly, yearly, etc. In some embodiments, the user may not have to input the hydrogen request, such as having an automated system that may determine the hydrogen request by reading a database of the customer's orders, required shipments, etc.

Figure 14:
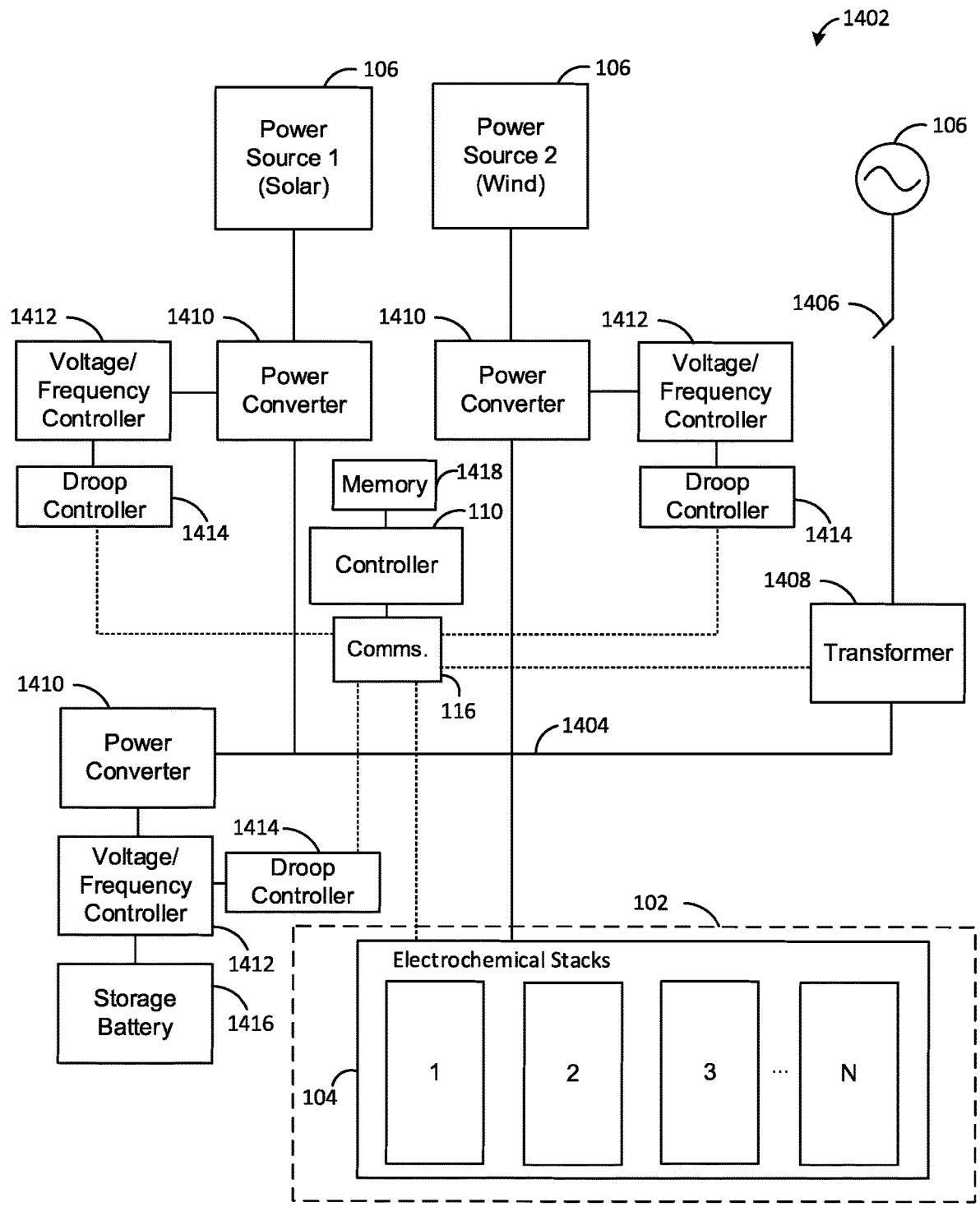
FIG. 14 is a schematic block diagram of a power management system, according to an embodiment.

FIG. 14 is a schematic block diagram of a power management system 1402 for a hydrogen generation system 102 according to an embodiment. The hydrogen generation system 1402 may include a plurality of electrochemical stacks 104 (as described in connection with FIG. 1), which are powered via an electrical grid 1404, e.g., a microgrid and/or a municipal power grid (e.g., electrical utility). The electrical grid 1404 receives power from one or more power sources 106, such as direct current (DC) power sources 106 (e.g., solar, wind, or battery) and/or alternating current (AC) power sources 106 (e.g., municipal power grid or diesel generators). In some embodiments, the electrical grid 1404 may only be powered by DC power sources 106, such as, for example, when the AC power sources 106 are disconnected via a switch 1406. In other embodiments, the electrochemical stacks 104 may only be powered by one or more AC power sources 106.

One or more of the AC power sources 106 may be coupled to the electrical grid 1404 via a transformer 1408, such as a step-down transformer, which converts the relatively high voltages received from a municipal power grid into voltages usable by the electrochemical stacks 104. The DC power sources 106 may be coupled to the electrical grid 1404 via power converters 1410, such as inverters, for converting DC current into AC current. The power converters 1410 may be coupled to voltage/frequency controllers 1412, which control the frequency and/or voltage of the output of the power converters 1410 under the direction, in some embodiments, of droop controllers 1414.

The droop controllers 1414 allow multiple AC power sources 106 to operate in parallel in synchronous mode on the same electrical grid 1404. The droop controllers 1414 enable the power converters 1410 (e.g., inverters) to behave similarly to AC generators, allowing multiple power converters 1410 to work in tandem by dividing loads in proportion to their power. For example, in the case of an AC generator, a generator's output and frequency are inversely proportional. When frequency decreases, output increases. If a generator has, e.g., a 5% droop setting, then a 5% decrease in frequency will increase the unit's power output by 100%. If, on the other hand, the frequency rises by 1%, the unit will decrease its power output by 20%.

In some embodiments, the power management system 1402 may include one or more storage batteries 1416 for storing excess electricity and cooperating with the power sources 106 to maintain stability of the electrical grid 1404. The storage battery 1416 may also be coupled to the electrical grid 1404 via a power converter 1410 (e.g., inverter) that is likewise controlled by a voltage/frequency controller 1412 and a droop controller 1414.

As an electrical grid 1404 cannot store energy, production and consumption should be balanced. For example, if there is a strong PV (solar) injection, and low power consumption by the electrochemical stacks 104, excess energy will be used to charge the storage battery 1416. If the PV power source 106 exceeds the rated power of the battery's power converter 1410, the droop controller 1414 will automatically raise the frequency of the electrical grid 1404. The power converter 1410 of the PV power source 106, in turn, will note the increase in frequency and throttle its injected power. Droop control eliminates the need for a complex energy management system (EMS) and enhances scalability.

In one embodiment, the controller 110 (as shown in FIG. 1) or a different controller or processor will cooperate with the aforementioned components to ensure grid stability and/or maintain a desired rate of hydrogen production. For example, if demand for electricity from the electrochemical stacks 104 exceeds the supply from the electrical grid 1404, the grid frequency will fall below a reference value. In such a case, one or more of the electrochemical stacks 104 may be deactivated or reduced in power in order to resolve the supply/demand mismatch. Alternatively, or in addition, power from the storage battery 1416 may be added to electrical grid 1404 via the power converter 1410. In either case, the frequency of the electrical grid 1404 will increase.

If, however, demand for electricity from the electrochemical stacks 104 is less than the supply from the electrical grid 1404, the grid frequency will go above the reference value. In such a case, one or more additional electrochemical stacks 104 may be brought online or at least one of the electrochemical stacks 104 increased in power to resolve the supply/demand mismatch. Alternatively, or in addition, excess power from the electrical grid 1404 may be used to charge the storage battery 1416. In either case, the frequency of the electrical grid 1404 will decrease.

In some embodiments, the reference value is set by the AC power source 106, such as the municipal power grid, which is fixed at 60 Hz in the United States. Alternatively, the reference value may be set based on the requirements of the electrochemical stacks 104 and a desired rate of hydrogen production. The reference value may be stored in a memory 1418 after it is received, for example, from the customer database 140 shown in FIGS. 1 and 10.

While the foregoing examples refer to grid frequency, voltage may also be used to regulate power supply/demand. For example, if the voltage of the electrical grid 1404 decreases, demand is exceeding supply, and similar corrective actions may be taken as in the case of decreased grid frequency. Likewise, if the voltage of the electrical grid 1404 increases, supply exceeds demand, and similar corrective actions may be taken as in the case if increased grid frequency.

In some embodiments, the controller 110 may be coupled to a communication interface, such as comms 116, that continually monitors a frequency or voltage of the electrical grid based on feedback from one or more of the power converters 1410, voltage/frequency controllers 1412, droop controllers 1414, transformers 1408, power sources 106, or other components of the system 102.

Figure 15:
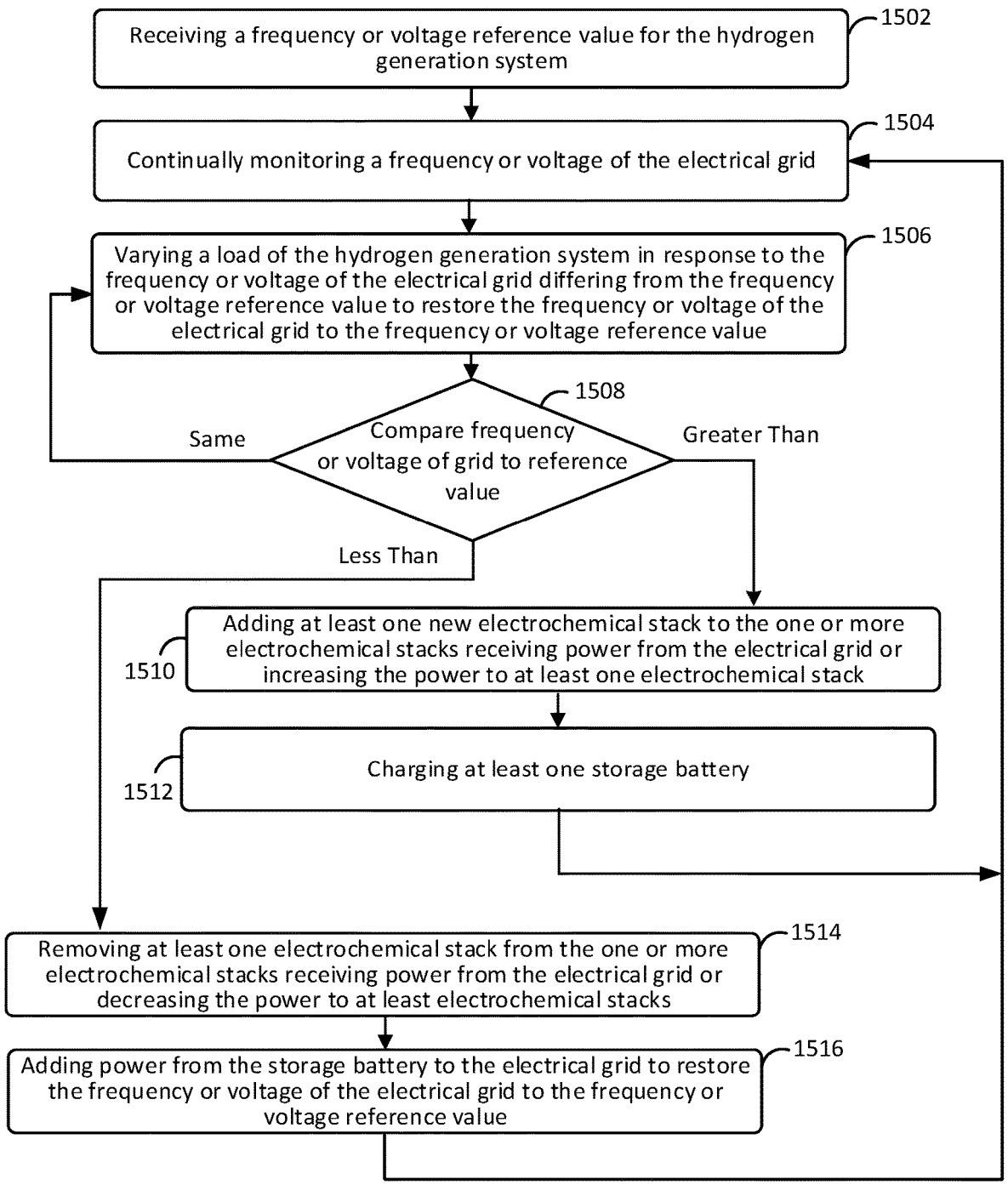
FIG. 15 is a flowchart of a method of power management for a hydrogen generation system, according to an embodiment.

With continued reference to FIG. 14, FIG. 15 is a flowchart of a method of power management for a hydrogen generation system 102 including one or more electrochemical stacks 104, the one or more electrochemical 104 stacks receiving power from an electrical grid 1404 including at least one power source 106. At step 1502, the method begins by receiving a frequency or voltage reference value for the hydrogen generation system 102. The frequency or voltage reference value may include an operating frequency of an electrical grid powering the system 102 and/or frequency or voltage needed to maintain a desired rate of hydrogen production. The electrical grid 1404 may include at least one of a municipal electrical grid and/or a microgrid including one or more direct current (DC) power sources coupled to the electrical grid via one or more power converters 1410 (e.g., inverters).

At step 1504, the method proceeds by continually monitoring a frequency or voltage of the electrical grid 1404. The frequency or voltage of the electrical grid 1404 may be monitored via a communicate interface (e.g., comms. 116) based on input from the power sources 106 and/or other components of the system 1402 and/or using one or more frequency or voltage sensors on the electrical grid 1404.

At step 1506, the method continues by varying a load of the hydrogen generation system in response to the frequency or voltage of the electrical grid differing from the frequency or voltage reference value to restore the frequency or voltage of the electrical grid to the frequency or voltage reference value.

For example, at step 1508, the method may continue by comparing the frequency or voltage of the electrical grid 1404 to the frequency or voltage reference value. If the frequency or voltage of the electrical grid 1404 is equal to the frequency or voltage reference value, the method returns to step 1504 in one embodiment. If the frequency or voltage of the electrical grid 1404 is greater than the frequency or voltage reference value, the method continues with step 1510. If the frequency or voltage of the electrical grid 1404 is less than the frequency or voltage reference value, the method continues with step 1514.

At step 1510, the method continues by adding (e.g., activating, bringing online, or physically connecting) at least one new electrochemical stack 104 to the one or more electrochemical stacks 104 receiving power from the electrical grid 1404 and/or increasing the power to at least one of the one or more of the electrochemical stacks 104. Alternatively, or in addition, at step 1512, the method may continue by charging at least one storage battery 1416. Either or both of steps 1510 and 1512 may reduce the frequency and/or voltage of the electrical grid 1404 in the direction of the frequency or voltage reference value. Thereafter, the method may return to step 1504.

At step 1514, the method may continue by removing (e.g., deactivating, bringing offline, or physically disconnecting) at least one electrochemical stack 104 from the one or more electrochemical stacks 104 receiving power from the electrical grid 1404 and/or decreasing the power to at least one of the one or more electrochemical stacks 104. Alternatively, or in addition, at step 1516, the method may continue by adding power from the storage battery 1416 to the electrical grid 1404 to restore the frequency or voltage of the electrical grid 1404 to the frequency or voltage reference value. Thereafter, the method may return to step 1504.

In some embodiments, the power management system 1402 may use droop control to maintain frequency or voltage stability of the electrical grid 1404 and/or maintain a desired rate of hydrogen production.

Numerous examples are provided herein to enhance understanding of the present disclosure. A specific set of statements is provided as follows.

Statement 1. A method for power management for a hydrogen generation system including one or more electrochemical stacks, the one or more electrochemical stacks receiving power from an electrical grid including at least one power source, the method comprising: receiving a frequency or voltage reference value for the hydrogen generation system; continually monitoring a frequency or voltage of the electrical grid; and varying a load of the hydrogen generation system in response to the frequency or voltage of the electrical grid differing from the frequency or voltage reference value to restore the frequency or voltage of the electrical grid to the frequency or voltage reference value.

Statement 2. The method of statement 1, wherein varying comprises increasing the load of the hydrogen generation system if the frequency or voltage of the electrical grid is greater than the frequency or voltage reference value.

Statement 3. The method of statements 1-2, wherein increasing the load comprises adding at least one new electrochemical stack to the one or more electrochemical stacks receiving power from the electrical grid or increasing the power to at least one of the one or more electrochemical stacks.

Statement 4. The method of statements 1-3, wherein increasing the load comprises charging at least one storage battery.

Statement 5. The method of statements 1-4, wherein varying comprises decreasing the load of the hydrogen generation system if the frequency or voltage of the electrical grid is lower than the frequency or voltage reference value.

Statement 6. The method of statements 1-5, wherein decreasing the load comprises removing at least one electrochemical stack from the one or more electrochemical stacks receiving power from the electrical grid or decreasing the power to at least one of the one or more electrochemical stacks.

Statement 7. The method of statements 1-6, further comprising adding power from a storage battery to the electrical grid to restore the frequency or voltage of the electrical grid to the frequency or voltage reference value.

Statement 8. The method of statements 1-7, wherein the electrical grid comprises at least one of a municipal electrical grid or a microgrid including one or more direct current (DC) power sources coupled to the electrical grid via one or more power converters.

Statement 9. The method of statements 1-8, further comprising using droop control to maintain frequency or voltage stability of the electrical grid.

Statement 10. The method of statements 1-9, wherein the frequency or voltage reference value comprises a frequency or voltage needed to maintain a rate of hydrogen production.

Statement 11. A power management system for a hydrogen generation system including one or more electrochemical stacks, the one or more electrochemical stacks receiving power from an electrical grid including at least one power source, the power management system comprising: a memory to store a frequency or voltage reference value for the hydrogen generation system; a communication interface continually monitoring a frequency or voltage of the electrical grid; and a controller to vary a load of the hydrogen generation system in response to the frequency or voltage of the electrical grid differing from the frequency or voltage reference value to restore the frequency or voltage of the electrical grid to the frequency or voltage reference value.

Statement 12. The power management system of statement 11, wherein the controller is to vary the load of the hydrogen generation system by increasing the load of the hydrogen generation system if the frequency or voltage of the electrical grid is greater than the frequency or voltage reference value.

Statement 13. The power management system of statements 11-12, wherein the controller is to increase the load by adding at least one new electrochemical stack to the one or more electrochemical stacks receiving power from the electrical grid or increasing the power to at least one of the one or more electrochemical stacks.

Statement 14. The power management system of statements 11-13, wherein the controller is to increase the load by charging at least one storage battery.

Statement 15. The power management system of statements 11-14, wherein the controller is to vary the load of the hydrogen generation system by decreasing the load of the hydrogen generation system if the frequency or voltage of the electrical grid is lower than the frequency or voltage reference value.

Statement 16. The power management system of statements 11-15, wherein the controller is to decrease the load by removing at least one electrochemical stack from the one or more electrochemical stacks receiving power from the electrical grid or decreasing the power to at least one of the one or more electrochemical stacks.

Statement 17. The power management system of statements 11-16, wherein the controller is further to add power from a storage battery to the electrical grid to restore the frequency or voltage of the electrical grid to the frequency or voltage reference value.

Statement 18. The power management system of statements 11-17, wherein the electrical grid comprises at least one of a municipal electrical grid or a microgrid including one or more direct current (DC) power sources coupled to the electrical grid via one or more power converters.

Statement 19. The power management system of statements 11-18, wherein the controller is to use droop control to maintain frequency or voltage stability of the electrical grid.

Statement 20. The power management system of statements 11-19, wherein the frequency or voltage reference value comprises a frequency or voltage needed to maintain a rate of hydrogen production.

Statement 21. A non-transitory computer-readable medium including program code that, when executed by one or more processors, cause the one or more processors to perform a method of power management for a hydrogen generation system including one or more electrochemical stacks, the one or more electrochemical stacks receiving power from an electrical grid including at least one power source, the method comprising: receive a frequency or voltage reference value for the hydrogen generation system; continually monitoring a frequency or voltage of the electrical grid; and varying a load of the hydrogen generation system in response to the frequency or voltage of the electrical grid differing from the frequency or voltage reference value to restore the frequency or voltage of the electrical grid to the frequency or voltage reference value.

As used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Many of the embodiments described herein are described in terms of sequences of actions to be performed by, for example, elements of a computing device. It should be recognized by those skilled in the art that specific circuits can perform the various sequence of actions described herein (e.g., application-specific integrated circuits or "ASICs") and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, any other magnetic medium, any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method of power management for a hydrogen generation system including one or more electrochemical stacks, the one or more electrochemical stacks receiving power from an electrical grid including a plurality of DC power sources and at least one AC power source, the method comprising:

storing a frequency or voltage reference value for the hydrogen generation system;

continually monitoring a frequency or voltage of the electrical grid;

receiving, via at least one transformer, AC power from the at least one AC power source and stepping down a voltage of the AC power from a first voltage to a second voltage;

receiving, via a plurality of power converters, DC power from a respective one of the plurality of DC power sources and converting the received DC power to AC power;

varying, via a plurality of voltage/frequency controllers, each voltage/frequency controller coupled with a respective power converter of the plurality of power converters, a load of the hydrogen generation system in response to the frequency or voltage of the electrical grid differing from the frequency or voltage reference value to restore the frequency or voltage of the electrical grid to the frequency or voltage reference value; and operating a plurality of droop controllers in a synchronous mode on the same electrical grid, each droop controller of the plurality of droop controllers coupled a respective one of the voltage/frequency controllers, such that the plurality of power converters divide electrical loads in proportion to their power, wherein each power converter's output and frequency are inversely proportional.

2. The method of claim 1, wherein varying comprises increasing the load of the hydrogen generation system if the frequency or voltage of the electrical grid is greater than the frequency or voltage reference value.

3. The method of claim 2, wherein increasing the load comprises adding at least one new electrochemical stack to the one or more electrochemical stacks receiving power from the electrical grid or increasing the power to at least one of the one or more electrochemical stacks.

4. The method of claim 2, wherein increasing the load comprises charging at least one storage battery.

5. The method of claim 1, wherein varying comprises decreasing the load of the hydrogen generation system if the frequency or voltage of the electrical grid is lower than the frequency or voltage reference value.

6. The method of claim 5, wherein decreasing the load comprises removing at least one electrochemical stack from the one or more electrochemical stacks receiving power from the electrical grid or decreasing the power to at least one of the one or more electrochemical stacks.

7. The method of claim 5, further comprising adding power from a storage battery to the electrical grid to restore the frequency or voltage of the electrical grid to the frequency or voltage reference value.

8. The method of claim 1, wherein the electrical grid comprises at least one of a municipal electrical grid or a microgrid including one or more direct current (DC) power sources coupled to the electrical grid via one or more power converters.

9. The method of claim 1, wherein the frequency or voltage reference value comprises a frequency or voltage needed to maintain a rate of hydrogen production.

10. A power management system for a hydrogen generation system including one or more electrochemical stacks, the one or more electrochemical stacks receiving power from an electrical grid including a plurality of DC power sources and at least one AC power source, the power management system comprising:
a memory to store a frequency or voltage reference value for the hydrogen generation system;
a communication interface continually monitoring a frequency or voltage of the electrical grid;
at least one transformer configured to receive AC power from the at least one AC power source and step down a voltage of the AC power from a first voltage to a second voltage;
a plurality of power converters coupled to the communication interface, each power converter configured to receive DC power from a respective one of the plurality of DC power sources and convert the received DC power to AC power;
a plurality of voltage/frequency controllers, each voltage/frequency controller coupled with a respective power converter of the plurality of power converters, each voltage/frequency controller configured to vary a load of the hydrogen generation system in response to the frequency or voltage of the electrical grid differing from the frequency or voltage reference value to restore the frequency or voltage of the electrical grid to the frequency or voltage reference value; and
a plurality of droop controllers, each droop controller of the plurality of droop controllers coupled a respective one of the voltage/frequency controllers, wherein the plurality of droop controllers operate in parallel in a synchronous mode on the same electrical grid, such that the plurality of power converters divide electrical loads in proportion to their power, wherein each power converter's output and frequency are inversely proportional.

11. The power management system of claim 10, wherein the controller is to vary the load of the hydrogen generation system by increasing the load of the hydrogen generation system if the frequency or voltage of the electrical grid is greater than the frequency or voltage reference value.

12. The power management system of claim 11, wherein the controller is to increase the load by adding at least one new electrochemical stack to the one or more electrochemical stacks receiving power from the electrical grid or increasing the power to at least one of the one or more electrochemical stacks.

13. The power management system of claim 11, wherein the controller is to increase the load by charging at least one storage battery.

14. The power management system of claim 10, wherein the controller is to vary the load of the hydrogen generation system by decreasing the load of the hydrogen generation system if the frequency or voltage of the electrical grid is lower than the frequency or voltage reference value.

15. The power management system of claim 14, wherein the controller is to decrease the load by removing at least one electrochemical stack from the one or more electrochemical stacks receiving power from the electrical grid or decreasing the power to at least one of the one or more electrochemical stacks.

16. The power management system of claim 14, wherein the controller is further to add power from a storage battery to the electrical grid to restore the frequency or voltage of the electrical grid to the frequency or voltage reference value.

17. The power management system of claim 10, wherein the electrical grid comprises at least one of a municipal electrical grid or a microgrid including one or more direct current (DC) power sources coupled to the electrical grid via one or more power converters.

18. The power management system of claim 10, wherein the frequency or voltage reference value comprises a frequency or voltage needed to maintain a rate of hydrogen production.

19. A non-transitory computer-readable medium including program code that, when executed by one or more processors, cause the one or more processors to perform a method of power management for a hydrogen generation system including one or more electrochemical stacks, the one or more electrochemical stacks receiving power from an electrical grid including a plurality of DC power sources and at least one AC power source, the method comprising:
storing a frequency or voltage reference value for the hydrogen generation system;
continually monitoring a frequency or voltage of the electrical grid;
receiving, via at least one transformer, AC power from the at least one AC power source and stepping down a voltage of the AC power from a first voltage to a second voltage;
receiving, via a plurality of power converters, DC power from a respective one of the plurality of DC power sources and converting the received DC power to AC power;
varying, via a plurality of voltage/frequency controllers, each voltage/frequency controller coupled with a respective power converter of the plurality of power converters, a load of the hydrogen generation system in response to the frequency or voltage of the electrical grid differing from the frequency or voltage reference value to restore the frequency or voltage of the electrical grid to the frequency or voltage reference value; and operating a plurality of droop controllers in a synchronous mode on the same electrical grid, each droop controller of the plurality of droop controllers coupled a respective one of the voltage/frequency controllers, such that the plurality of power converters divide electrical loads in proportion to their power, wherein each power converter's output and frequency are inversely proportional.

* * * * *